United States Patent
Abhari et al.

(10) Patent No.: US 11,459,523 B2
(45) Date of Patent: Oct. 4, 2022

(54) METHOD FOR THE PRETREATMENT OF A BIOFUEL FEEDSTOCK

(71) Applicant: REG SYNTHETIC FUELS, LLC

(72) Inventors: Ramin Abhari, Bixby, OK (US); Martin Haverly, Ames, IA (US); Trevor Fisher, Bixby, OK (US)

(73) Assignee: REG Synthetic Fuels, LLC, Ames, IA (US)

( * ) Notice: Subject to any disclaimer, the term of this patent is extended or adjusted under 35 U.S.C. 154(b) by 0 days.

(21) Appl. No.: 17/390,437

(22) Filed: Jul. 30, 2021

(65) Prior Publication Data
US 2022/0033731 A1 Feb. 3, 2022

Related U.S. Application Data

(60) Provisional application No. 63/059,749, filed on Jul. 31, 2020.

(51) Int. Cl.
*C11B 3/00* (2006.01)
*B01D 15/08* (2006.01)
(Continued)

(52) U.S. Cl.
CPC .............. *C11B 3/001* (2013.01); *B01D 15/08* (2013.01); *C10L 1/02* (2013.01); *C11B 3/006* (2013.01);
(Continued)

(58) Field of Classification Search
CPC .............. C10L 1/02; C10L 2200/0484; C10L 2290/541; C10L 2290/542; C11B 3/001; C11B 3/006; C11B 3/10; B01D 15/08
See application file for complete search history.

(56) References Cited

U.S. PATENT DOCUMENTS

| 6,015,915 A | 1/2000 | Jamil et al. |
| 6,407,271 B1 | 6/2002 | Deffense |

(Continued)

OTHER PUBLICATIONS

International Search Report and Written Opinion on PCT/US2021/044042 dated Nov. 12, 2021 (14 pages).

*Primary Examiner* — Cephia D Toomer
(74) *Attorney, Agent, or Firm* — Foley & Lardner LLP

(57) ABSTRACT

In an aspect, a method is disclosed that includes contacting a composition with an aqueous solution to yield a mixture, where the composition includes one or more of animal fats, animal oils, plant fats, plant oils, vegetable fats, vegetable oils, greases, and used cooking oil, about 5 wt. % or more of free fatty acids, about 10 wppm or more of total metals, about 8 wppm or more phosphorus, about 20 wppm or more of nitrogen, and the aqueous solution includes $((NH_4)_2H_2EDTA$, $(NH_4)_4EDTA$, a monoammonium salt of diethylenetriaminepentaacetic acid, a diammonium salt of diethylenetriaminepentaacetic acid, a triammonium salt of diethylenetriaminepentaacetic acid, a tetraammonium salt of diethylenetriaminepentaacetic acid, $(NH_4)_5DTPA$, a combination of citric acid and $Na_4EDTA$, a combination of citric acid and $Na_2H_2EDTA$, a combination of citric acid and a monosodium salt of diethylenetriaminepentaacetic acid, a combination of citric acid and a disodium salt of diethylenetriaminepentaacetic acid, a combination of citric acid and a trisodium salt of diethylenetriaminepentaacetic acid, a combination of citric acid and a tetrasodium salt of diethylenetriaminepentaacetic acid, a combination of citric acid and $Na_5DTPA$, or a combination of any two or more thereof, where the method further includes centrifuging the mixture to yield a first treated composition, wherein the first treated composition has less total metals and less phosphorus than the composition.

20 Claims, 1 Drawing Sheet

(51) Int. Cl.
*C10L 1/02* (2006.01)
*C11B 3/10* (2006.01)

(52) U.S. Cl.
CPC ......... *C11B 3/10* (2013.01); *C10L 2200/0484* (2013.01); *C10L 2290/541* (2013.01); *C10L 2290/542* (2013.01)

(56) References Cited

U.S. PATENT DOCUMENTS

2019/0031964 A1* 1/2019 Doyle .................... C10G 53/02
2020/0190407 A1 6/2020 Gutierrez et al.

* cited by examiner

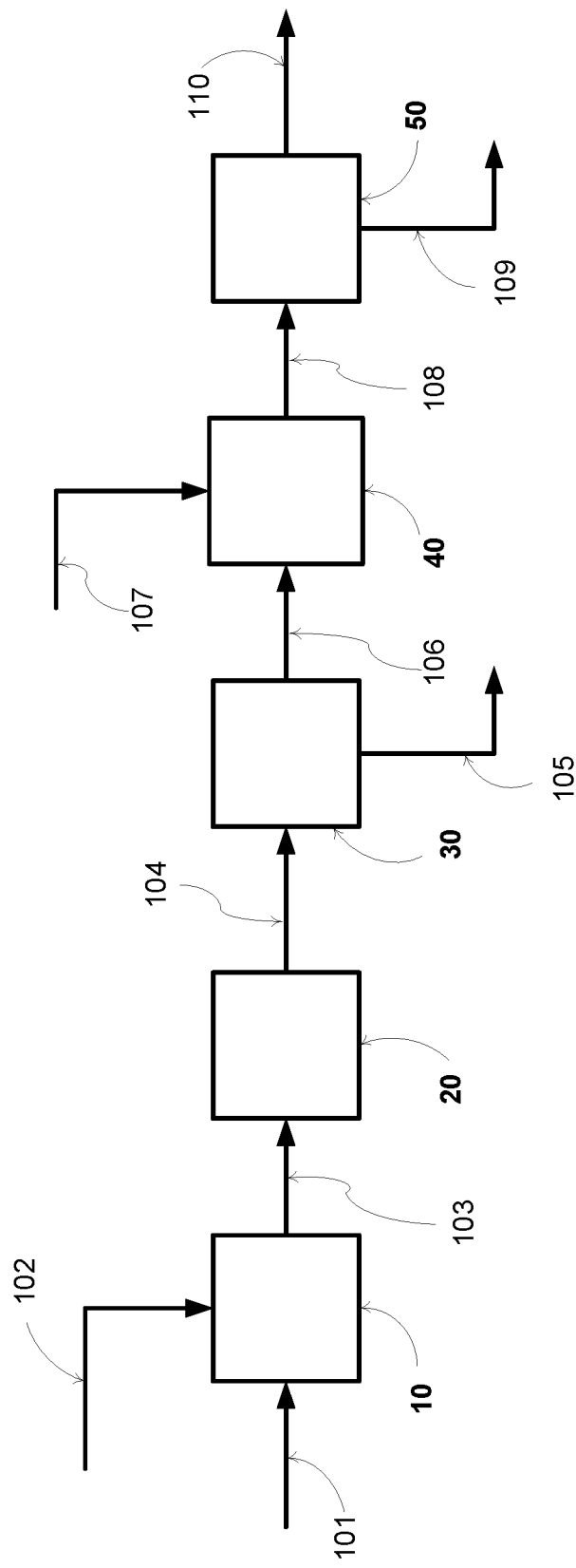

METHOD FOR THE PRETREATMENT OF A BIOFUEL FEEDSTOCK

CROSS-REFERENCE TO RELATED APPLICATIONS

This application claims the benefit of and priority to U.S. Provisional Appl. No. 63/059,749, filed Jul. 31, 2020, the entirety of which is herein incorporated by reference for any and all purposes.

FIELD

The present technology relates generally to the processing of compositions that may be used as biorenewable feedstocks for hydroprocessing. More particularly, and not by way of limitation, the present technology provides a method for upgrading low-value and waste fat, oil, and grease compositions to produce treated compositions having reduced amounts of total metals and phosphorous.

SUMMARY

In an aspect, the present technology provides a method that includes contacting a composition with an aqueous solution to yield a mixture, where the composition includes one or more of animal fats, animal oils, plant fats, plant oils, vegetable fats, vegetable oils, greases, and used cooking oil, about 5 wt. % or more of free fatty acids, about 10 wppm or more of total metals, about 8 wppm or more phosphorus, about 20 wppm or more of nitrogen, and the aqueous solution includes diammonium dihydrogen ethylenediaminetetraacetate ("$(NH_4)_2H_2EDTA$"; CAS #20824-56-0), tetraammonium ethylenediaminetetraacetate ("$(NH_4)_4EDTA$"; CAS #22473-78-5), a monoammonium salt of diethylenetriaminepentaacetic acid, a diammonium salt of diethylenetriaminepentaacetic acid, a triammonium salt of diethylenetriaminepentaacetic acid, a tetraammonium salt of diethylenetriaminepentaacetic acid, pentaammonium diethylenetriaminepentaacetate ("$(NH_4)_5DTPA$"), a combination of citric acid and tetrasodium ethylenediaminetetraacetate ("$Na_4EDTA$"; CAS #13235-36-4), a combination of citric acid and disodium ethylenediaminetetraacetate ("$Na_2H_2EDTA$"; CAS #139-33-3), a combination of citric acid and a monosodium salt of diethylenetriaminepentaacetic acid, a combination of citric acid and a disodium salt of diethylenetriaminepentaacetic acid, a combination of citric acid and a trisodium salt of diethylenetriaminepentaacetic acid, a combination of citric acid and a tetrasodium salt of diethylenetriaminepentaacetic acid, a combination of citric acid and pentasodium diethylenetriaminepentaacetate ("$Na_5DTPA$"; CAS #140-01-2), or a combination of any two or more thereof. The method also includes centrifuging the mixture to yield a first treated composition, wherein the first treated composition has less total metals and less phosphorus than the composition.

BRIEF DESCRIPTION OF THE DRAWING

FIG. 1 is a schematic diagram of an illustrative embodiment of a method of the present technology, as discussed in the present disclosure.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term—for example, "about 10 weight %" would be understood to mean "9 weight % to 11 weight %." It is to be understood that when "about" precedes a term, the term is to be construed as disclosing "about" the term as well as the term without modification by "about"—for example, "about 10 wt. %" discloses "9 wt. % to 11 wt. %" as well as disclosing "10 wt. %."

The phrase "and/or" as used in the present disclosure will be understood to mean any one of the recited members individually or a combination of any two or more thereof—for example, "A, B, and/or C" would mean "A, B, C, A and B, A and C, or B and C."

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Hydroprocessing as used herein describes the various types of catalytic reactions that occur in the presence of hydrogen without limitation. Examples of the most common hydroprocessing reactions include, but are not limited to, hydrogenation, hydrodesulfurization (HDS), hydrodenitrogenation (HDN), hydrotreating (HT), hydrocracking (HC), aromatic saturation or hydrodearomatization (HDA), hydrodeoxygenation (HDO), decarboxylation (DCO), hydroisomerization (HI), hydrodewaxing (HDW), hydrodemetallization (HDM), decarbonylation, methanation, and reforming. Depending upon the type of catalyst, reactor configuration, reactor conditions, and feedstock composition, multiple reactions can take place that range from purely thermal (i.e., do not require catalyst) to catalytic. In the case of describing the main function of a particular hydroprocessing unit, for example an HDO reaction system, it is understood that the HDO reaction is merely one of the predominant reactions that are taking place and that other reactions may also take place.

Pyrolysis is understood to mean thermochemical decomposition of carbonaceous material with little to no diatomic oxygen or diatomic hydrogen present during the thermochemical reaction. The optional use of a catalyst in pyrolysis is typically referred to as catalytic cracking, which is encompassed by the term as pyrolysis, and is not be confused with hydrocracking.

Hydrotreating (HT) involves the removal of elements from groups 3, 5, 6, and/or 7 of the Periodic Table from organic compounds. Hydrotreating may also include hydrodemetallization (HDM) reactions. Hydrotreating thus involves removal of heteroatoms such as oxygen, nitrogen, sulfur, and combinations of any two more thereof through hydroprocessing. For example, hydrodeoxygenation (HDO) is understood to mean removal of oxygen by a catalytic hydroprocessing reaction to produce water as a by-product; similarly, hydrodesulfurization (HDS) and hydrodenitrogenation (HDN) describe the respective removal of the indicated elements through hydroprocessing.

Hydrogenation involves the addition of hydrogen to an organic molecule without breaking the molecule into subunits. Addition of hydrogen to a carbon-carbon or carbon-oxygen double bond to produce single bonds are two non-limiting examples of hydrogenation. Partial hydrogenation and selective hydrogenation are terms used to refer to hydrogenation reactions that result in partial saturation of an unsaturated feedstock. For example, vegetable oils with a high percentage of polyunsaturated fatty acids (e.g., linoleic acid) may undergo partial hydrogenation to provide a hydro-processed product wherein the polyunsaturated fatty acids are converted to mono-unsaturated fatty acids (e.g., oleic acid) without increasing the percentage of undesired saturated fatty acids (e.g., stearic acid). While hydrogenation is distinct from hydrotreatment, hydroisomerization, and hydrocracking, hydrogenation may occur amidst these other reactions.

Hydrocracking (HC) is understood to mean the breaking of a molecule's carbon-carbon bond to form at least two molecules in the presence of hydrogen. Such reactions typically undergo subsequent hydrogenation of the resulting double bond.

Hydroisomerization (HI) is defined as the skeletal rearrangement of carbon-carbon bonds in the presence of hydrogen to form an isomer. Hydrocracking is a competing reaction for most HI catalytic reactions and it is understood that the HC reaction pathway, as a minor reaction, is included in the use of the term HI. Hydrodewaxing (HDW) is a specific form of hydrocracking and hydroisomerization designed to improve the low temperature characteristics of a hydrocarbon fluid.

It will be understood that if a composition is stated to include "$C_x$-$C_y$ hydrocarbons," such as $C_7$-$C_{12}$ n-paraffins, this means the composition includes one or more paraffins with a carbon number falling in the range from x toy.

The phrase "at least a portion of" in regard to a composition means from about 1% to about 100% of the composition.

A "diesel fuel" in general refers to a fuel with a boiling point that falls in the range from about 150° C. to about 360° C. (the "diesel boiling range").

A "gasoline" in general refers to a fuel for spark-ignition engines with a boiling point that falls in the range from about 30° C. to about 200° C.

A "biodiesel" as used herein refers to fatty acid $C_1$-$C_4$ alkyl esters produced by esterification and/or transesterification reactions between a $C_1$-$C_4$ alkyl alcohol and free fatty acids and/or fatty acid glycerides, such as described in U.S. Pat. Publ. No. 2016/0145536, incorporated herein by reference.

A "petroleum diesel" as used herein refers to diesel fuel produced from crude oil, such as in a crude oil refining facility and includes hydrotreated straight-run diesel, hydrotreated fluidized catalytic cracker light cycle oil, hydrotreated coker light gasoil, hydrocracked FCC heavy cycle oil, and combinations thereof. Similarly, a "petroleum-derived" compound or composition refers to a compound or composition produced directly from crude oil or produced from components and/or feedstocks that ultimately were produced from crude oil and not biorenewable feedstocks.

It is to be understood that a "volume percent" or "vol. %" of a component in a composition or a volume ratio of different components in a composition is determined at 60° F. based on the initial volume of each individual component, not the final volume of combined components.

Throughout this disclosure, various publications, patents and published patent specifications are referenced by an identifying citation. Also within this disclosure are Arabic numerals referring to referenced citations, the full bibliographic details of which are provided preceding the claims. The disclosures of these publications, patents and published patent specifications are hereby incorporated by reference into the present disclosure.

The Present Technology

Hydrodeoxygenation (HDO) of fats, oils, and greases (FOG) is a critical step in the renewable diesel production process. FOG feedstocks of commercial interest include byproducts of rendering and food processing industries such as inedible tallow and used cooking oils. FOG feedstocks also include byproducts of palm oil and bioethanol industries such as palm sludge oil and distillers corn oil. These feeds are characterized by high free fatty acid (FFA) content, typically above 5 wt. %, and relatively high levels of metal and phosphorus (typically above 20 wppm total), and alkalinity values above 200 mg/kg.

Such byproduct FOG feeds are also considered to be more sustainable. Based on methodology adopted by the California Air Resources Board, renewable diesel derived from used cooking oil has a life cycle greenhouse gas emission of less than 30 g $CO_2$ equivalent per megajoule of combustion energy provided (g$CO_{2e}$/MJ). This compares to 100 g$CO_{2e}$/MJ for petroleum diesel and 50 g$CO_{2e}$/MJ for renewable diesel produced from refined oils (e.g., refined, bleached, and deodorized vegetable oils). The life cycle greenhouse gas emission value is also referred to as Carbon Intensity or C.I.

The current methods of FOG pretreatment for renewable diesel production struggle to achieve contaminant reduction levels for optimum HDO reactor performance. Typical performance issues associated with feed contaminants include fouling of the reactor catalyst beds with deposits rich in phosphorus and metals, as well as deactivation of the catalyst due to metals, phosphorus, and/or silicon.

The prior art discloses various "degumming" processes for removal of phosphorus compounds from fats and oils. Most these phosphorus compounds are present as phospholipids. A general structure of a phospholipid is that of a triglyceride with one of the fatty acids replaced by a phosphate species, as illustrated by the phosphatidic acid illustratively represented by Formula (I) below.

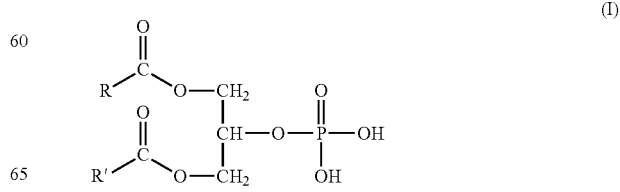

Due to their surfactant properties, phospholipids migrate to the oil/water interface when the lipid is contacted with water. This so-called "hydration" step is an effective means of removing most phospholipids in fats and oils. However, a class of phospholipids, referred to as non-hydratable phospholipids (NHPs), remains soluble in the oil after hydration. NHPs are generally in the form of divalent metal salts of phosphatidic acid and are illustratively represented by Formula II below, where $M^{2+}$ is a divalent metal such as calcium or magnesium.

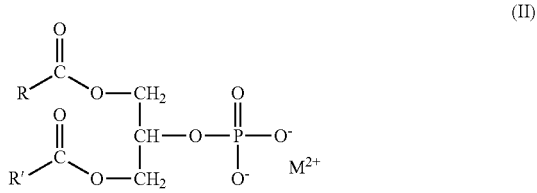

(II)

The prior art teaches that effective removal of phosphorus and metals requires converting the non-hydratable phospholipids (NHPs) present in fats and oils. The prior art further discloses that phosphoric acid or citric acid can split the ionic bond between divalent metals of NHPs and the phosphate group, thus releasing the phospholipid from the oil phase to the oil/water interface. The prior art also teaches that citric acid and phosphoric acid can also act as a chelating agent wherein the divalent metal can coordinate with the acid to mitigate further interaction between phosphate groups and the divalent metal and also enhancing the migration of the chelated divalent metal into the water phase. The prior art also teaches use of disc-stack centrifuges for continuous separation of the acid degummed oil from the heavy phase (water and oil/water interface).

The prior art further teaches that ethylenediaminetetraacetic acid (EDTA) is an efficient chelating agent for polyvalent metals, with a higher ability to form water-soluble complexes with said metal ions than most other common chelating agents. However, EDTA has poor solubility in water and generally needs to be introduced as a metal salt (e.g., as sodium salts of EDTA) for applications that require transfer of the metals into aqueous phase. As shown in the comparative examples of the present disclosure, the use of these EDTA salts for treatment of high-FFA FOG feeds results in soap formation (e.g., sodium oleate) and the consequent retention of the metal cation in the oil phase.

Thus, there remains an unmet need for a feed pretreatment process utilizing more effective chelating agents that is suitable for high-FFA FOG feedstock. It is to that need that the present technology is directed.

The present technology relates to a method of treatment, e.g., of a FOG feedstock for production of biomass-based diesel fuels and fuel blendstocks. The present technology is particularly advantageous as a pretreatment method for renewable diesel production, where very low levels of metals and phosphorus contaminants yielded by the method provide for optimum performance in such renewable diesel production.

Accordingly, in an aspect, the present technology provides a method that includes contacting a composition with an aqueous solution to yield a mixture, where the composition includes one or more of animal fats, animal oils, plant fats, plant oils, vegetable fats, vegetable oils, greases, and used cooking oil, about 5 wt. % or more of free fatty acids, about 10 wppm or more of total metals, about 8 wppm or more phosphorus, about 20 wppm or more of nitrogen, and the aqueous solution includes diammonium dihydrogen ethylenediaminetetraacetate ("$(NH_4)_2H_2EDTA$"; CAS #20824-56-0), tetraammonium ethylenediaminetetraacetate ("$(NH_4)_4EDTA$"; CAS #22473-78-5), a monoammonium salt of diethylenetriaminepentaacetic acid, a diammonium salt of diethylenetriaminepentaacetic acid, a triammonium salt of diethylenetriaminepentaacetic acid, a tetraammonium salt of diethylenetriaminepentaacetic acid, pentaammonium diethylenetriaminepentaacetate ("$(NH_4)_5DTPA$"), a combination of citric acid and tetrasodium ethylenediaminetetraacetate ("$Na_4EDTA$"; CAS #13235-36-4), a combination of citric acid and disodium ethylenediaminetetraacetate ("$Na_2H_2EDTA$"; CAS #139-33-3), a combination of citric acid and a monosodium salt of diethylenetriaminepentaacetic acid, a combination of citric acid and a disodium salt of diethylenetriaminepentaacetic acid, a combination of citric acid and a trisodium salt of diethylenetriaminepentaacetic acid, a combination of citric acid and a tetrasodium salt of diethylenetriaminepentaacetic acid, a combination of citric acid and pentasodium diethylenetriaminepentaacetate ("$Na_5DTPA$"; CAS #140-01-2), or a combination of any two or more thereof. In any embodiment disclosed herein, the aqueous solution may have a pH of about 4 to about 6; thus, in any embodiment disclosed herein, the aqueous solution may have a pH of about 6.0, about 5.5, about 5.0, about 4.5, about 4.0, or any range including and/or in between any two of these values or any range below any one of these values. In any embodiment disclosed herein, the contacting may include high shear mixing of the composition and the aqueous solution.

The method also includes centrifuging the mixture to yield a first treated composition, wherein the first treated composition has less total metals and less phosphorus than the composition. The first treated composition of any embodiment disclosed herein may have an amount of total metals that is about 20% or less than the amount of total metals in the composition (e.g., where the composition has 20 wppm total metals, the first treated composition has 4 wppm or less total metals). The first treated composition of any embodiment disclosed herein may have an amount of phosphorus that is about 20% or less than the amount of phosphorus in the composition. In any embodiment disclosed herein, the centrifuging may include use of a disc-stack centrifuge, a decanter centrifuge, and/or a 3-phase centrifuge. Other methods, systems, and apparatus for separating centrifuging the mixture may be included. These include methods, systems, and apparatus such as settling tanks and are known to persons of ordinary skill in the art.

In embodiment disclosed herein, a volume ratio of the composition to the aqueous solution during the contacting may be about 10:1 to about 100:1. Thus, in any embodiment disclosed herein, the volume ratio of the composition to the aqueous solution may be about 10:1, about 11:1, about 12:1, about 13:1, about 14:1, about 15:1, about 16:1, about 17:1, about 18:1, about 19:1, about 20:1, about 22:1, about 24:1, about 26:1, about 28:1, about 30:1, about 35:1, about 40:1, about 45:1, about 50:1, about 55:1, about 60:1, about 65:1, about 70:1, about 75:1, about 80:1, about 85:1, about 90:1, about 95:1, about 100:1, or any range including and/or in between any two of these values.

In any embodiment disclosed herein, the contacting may occur at a temperature of about 140° F. to about 300° F. Thus, in any embodiment disclosed herein, the contacting may occur at a temperature of about 140° F., about 145° F., about 150° F., about 155° F., about 160° F., about 165° F., about 170° F., about 175° F., about 180° F., about 185° F., about 190° F., about 195° F., about 200° F., about 205° F., about 210° F., about 215° F., about 220° F., about 225° F., about 230° F., about 240° F., about 245° F., about 250° F., about 255° F., about 260° F., about 265° F., about 270° F., about 275° F., about 280° F., about 285° F., about 290° F., about 295° F., about 300° F., or any range including and/or in between any two of these values.

In any embodiment disclosed herein, the aqueous solution may include about 10 wt. % to about 60 wt. % of (NH$_4$)$_2$H$_2$EDTA, (NH$_4$)$_4$EDTA, (NH$_4$)$_5$DTPA, Na$_4$EDTA, Na$_2$H$_2$EDTA, Na$_5$DTPA, or a combination of any two or more thereof. Thus, in any embodiment herein, the aqueous solution may include (NH$_4$)$_2$H$_2$EDTA, (NH$_4$)$_4$EDTA, (NH$_4$)$_5$DTPA, Na$_4$EDTA, Na$_2$H$_2$EDTA, Na$_5$DTPA, or a combination of any two or more thereof in an amount of about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 30 wt. %, about 35 wt. %, about 40 wt. %, about 45 wt. %, about 50 wt. %, about 55 wt. %, about 60 wt. %, or any range including and/or in between any two of these values.

In any embodiment disclosed herein, during the contacting there may be a weight ratio of the composition to (NH$_4$)$_2$H$_2$EDTA (i.e., the (NH$_4$)$_2$H$_2$EDTA in the aqueous solution prior to contacting) of about 50:1 to about 500:1; thus, the weight ratio of the composition to (NH$_4$)$_2$H$_2$EDTA in the aqueous solution may be about 50:1, about 55:1, about 60:1, about 65:1, about 70:1, about 75:1, about 80:1, about 85:1, about 90:1, about 95:1, about 100:1, about 120:1, about 140:1, about 160:1, about 180:1, about 200:1, about 220:1, about 240:1, about 260;1, about 280:1, about 300:1, about 320:1, about 340:1, about 360:1, about 380:1, about 400:1, about 420:1, about 440:1, about 460:1, about 480:1, about 500:1, or any range including and/or in between any two of these values. In any embodiment disclosed herein, the aqueous solution may include citric acid as well as (NH$_4$)$_2$H$_2$EDTA, and may include a molar ratio of citric acid to (NH$_4$)$_2$H$_2$EDTA of about 1:3, about 1:2, about 1:1, about 2:1, about 3:1, or any range including and/or in between any two of these values. In any embodiment disclosed herein, the aqueous solution may include phosphoric acid as well as (NH$_4$)$_2$H$_2$EDTA, and may include a molar ratio of phosphoric acid to (NH$_4$)$_2$H$_2$EDTA of about 1:3, about 1:2, about 1:1, about 2:1, about 3:1, or any range including and/or in between any two of these values.

In any embodiment disclosed herein, during the contacting there may be a weight ratio of the composition to (NH$_4$)$_4$EDTA (i.e., the (NH$_4$)$_4$EDTA in the aqueous solution prior to contacting) of about 50:1 to about 500:1; thus, the weight ratio of the composition to (NH$_4$)$_4$EDTA in the aqueous solution may be about 50:1, about 55:1, about 60:1, about 65:1, about 70:1, about 75:1, about 80:1, about 85:1, about 90:1, about 95:1, about 100:1, about 120:1, about 140:1, about 160:1, about 180:1, about 200:1, about 220:1, about 240:1, about 260;1, about 280:1, about 300:1, about 320:1, about 340:1, about 360:1, about 380:1, about 400:1, about 420:1, about 440:1, about 460:1, about 480:1, about 500:1, or any range including and/or in between any two of these values. In any embodiment disclosed herein, the aqueous solution may include citric acid as well as (NH$_4$)$_4$EDTA, and may include a molar ratio of citric acid to (NH$_4$)$_4$EDTA of about 1:3, about 1:2, about 1:1, about 2:1, about 3:1, or any range including and/or in between any two of these values. In any embodiment disclosed herein, the aqueous solution may include phosphoric acid as well as (NH$_4$)$_4$EDTA, and may include a molar ratio of phosphoric acid to (NH$_4$)$_4$EDTA of about 1:3, about 1:2, about 1:1, about 2:1, about 3:1, or any range including and/or in between any two of these values.

In any embodiment disclosed herein, during the contacting there may be a weight ratio of the composition to the monoammonium salt of diethylenetriaminepentaacetic acid (i.e., the monoammonium salt of diethylenetriaminepentaacetic acid in the aqueous solution prior to contacting) of about 50:1 to about 500:1; thus, the weight ratio of the composition to the monoammonium salt of diethylenetriaminepentaacetic acid in the aqueous solution may be about 50:1, about 55:1, about 60:1, about 65:1, about 70:1, about 75:1, about 80:1, about 85:1, about 90:1, about 95:1, about 100:1, about 120:1, about 140:1, about 160:1, about 180:1, about 200:1, about 220:1, about 240:1, about 260;1, about 280:1, about 300:1, about 320:1, about 340:1, about 360:1, about 380:1, about 400:1, about 420:1, about 440:1, about 460:1, about 480:1, about 500:1, or any range including and/or in between any two of these values. In any embodiment disclosed herein, the aqueous solution may include citric acid as well as the monoammonium salt of diethylenetriaminepentaacetic acid, and may include a molar ratio of citric acid to (NH$_4$)$_5$DTPA of about 1:3, about 1:2, about 1:1, about 2:1, about 3:1, or any range including and/or in between any two of these values. In any embodiment disclosed herein, the aqueous solution may include phosphoric acid as well as the monoammonium salt of diethylenetriaminepentaacetic acid, and may include a molar ratio of phosphoric acid to the monoammonium salt of diethylenetriaminepentaacetic acid of about 1:3, about 1:2, about 1:1, about 2:1, about 3:1, or any range including and/or in between any two of these values.

In any embodiment disclosed herein, during the contacting there may be a weight ratio of the composition to the diammonium salt of diethylenetriaminepentaacetic acid (i.e., the diammonium salt of diethylenetriaminepentaacetic acid in the aqueous solution prior to contacting) of about 50:1 to about 500:1; thus, the weight ratio of the composition to the diammonium salt of diethylenetriaminepentaacetic acid in the aqueous solution may be about 50:1, about 55:1, about 60:1, about 65:1, about 70:1, about 75:1, about 80:1, about 85:1, about 90:1, about 95:1, about 100:1, about 120:1, about 140:1, about 160:1, about 180:1, about 200:1, about 220:1, about 240:1, about 260;1, about 280:1, about 300:1, about 320:1, about 340:1, about 360:1, about 380:1, about 400:1, about 420:1, about 440:1, about 460:1, about 480:1, about 500:1, or any range including and/or in between any two of these values. In any embodiment disclosed herein, the aqueous solution may include citric acid as well as the diammonium salt of diethylenetriaminepentaacetic acid, and may include a molar ratio of citric acid to the diammonium salt of diethylenetriaminepentaacetic acid of about 1:3, about 1:2, about 1:1, about 2:1, about 3:1, or any range including and/or in between any two of these values. In any embodiment disclosed herein, the aqueous solution may include phosphoric acid as well as the diammonium salt of diethylenetriaminepentaacetic acid, and may include a molar ratio of phosphoric acid to the diammonium salt of diethylenetriaminepentaacetic acid of about 1:3, about 1:2, about 1:1, about 2:1, about 3:1, or any range including and/or in between any two of these values.

In any embodiment disclosed herein, during the contacting there may be a weight ratio of the composition to the triammonium salt of diethylenetriaminepentaacetic acid (i.e., the triammonium salt of diethylenetriaminepentaacetic acid in the aqueous solution prior to contacting) of about 50:1 to about 500:1; thus, the weight ratio of the composition to the triammonium salt of diethylenetriaminepentaacetic acid in the aqueous solution may be about 50:1, about 55:1, about 60:1, about 65:1, about 70:1, about 75:1, about 80:1, about 85:1, about 90:1, about 95:1, about 100:1, about 120:1, about 140:1, about 160:1, about 180:1, about 200:1, about 220:1, about 240:1, about 260;1, about 280:1, about 300:1, about 320:1, about 340:1, about 360:1, about 380:1, about 400:1, about 420:1, about 440:1, about 460:1, about 480:1, about 500:1, or any range including and/or in between any two of these values. In any embodiment disclosed herein, the aqueous solution may include citric acid as well as the triammonium salt of diethylenetriaminepentaacetic acid, and may include a molar ratio of citric acid to the triammonium salt of diethylenetriaminepentaacetic acid of about 1:3, about 1:2, about 1:1, about 2:1, about 3:1, or any range including and/or in between any two of these values. In any embodiment disclosed herein, the aqueous solution may include phosphoric acid as well as the triammonium salt of diethylenetriaminepentaacetic acid, and may include a molar ratio of phosphoric acid to the triammonium salt of diethylenetriaminepentaacetic acid of about 1:3, about 1:2, about 1:1, about 2:1, about 3:1, or any range including and/or in between any two of these values.

In any embodiment disclosed herein, during the contacting there may be a weight ratio of the composition to the tetraammonium salt of diethylenetriaminepentaacetic acid (i.e., the tetraammonium salt of diethylenetriaminepentaacetic acid in the aqueous solution prior to contacting) of about 50:1 to about 500:1; thus, the weight ratio of the composition to the tetraammonium salt of diethylenetriaminepentaacetic acid in the aqueous solution may be about 50:1, about 55:1, about 60:1, about 65:1, about 70:1, about 75:1, about 80:1, about 85:1, about 90:1, about 95:1, about 100:1, about 120:1, about 140:1, about 160:1, about 180:1, about 200:1, about 220:1, about 240:1, about 260;1, about 280:1, about 300:1, about 320:1, about 340:1, about 360:1, about 380:1, about 400:1, about 420:1, about 440:1, about 460:1, about 480:1, about 500:1, or any range including and/or in between any two of these values. In any embodiment disclosed herein, the aqueous solution may include citric acid as well as the tetraammonium salt of diethylenetriaminepentaacetic acid, and may include a molar ratio of citric acid to the tetraammonium salt of diethylenetriaminepentaacetic acid of about 1:3, about 1:2, about 1:1, about 2:1, about 3:1, or any range including and/or in between any two of these values. In any embodiment disclosed herein, the aqueous solution may include phosphoric acid as well as the tetraammonium salt of diethylenetriaminepentaacetic acid, and may include a molar ratio of phosphoric acid to the tetraammonium salt of diethylenetriaminepentaacetic acid of about 1:3, about 1:2, about 1:1, about 2:1, about 3:1, or any range including and/or in between any two of these values.

In any embodiment disclosed herein, during the contacting there may be a weight ratio of the composition to $(NH_4)_5DTPA$ (i.e., the $(NH_4)_5DTPA$ in the aqueous solution prior to contacting) of about 50:1 to about 500:1; thus, the weight ratio of the composition to $(NH_4)_5DTPA$ in the aqueous solution may be about 50:1, about 55:1, about 60:1, about 65:1, about 70:1, about 75:1, about 80:1, about 85:1, about 90:1, about 95:1, about 100:1, about 120:1, about 140:1, about 160:1, about 180:1, about 200:1, about 220:1, about 240:1, about 260;1, about 280:1, about 300:1, about 320:1, about 340:1, about 360:1, about 380:1, about 400:1, about 420:1, about 440:1, about 460:1, about 480:1, about 500:1, or any range including and/or in between any two of these values. In any embodiment disclosed herein, the aqueous solution may include citric acid as well as $(NH_4)_5DTPA$, and may include a molar ratio of citric acid to $(NH_4)_5DTPA$ of about 1:3, about 1:2, about 1:1, about 2:1, about 3:1, or any range including and/or in between any two of these values. In any embodiment disclosed herein, the aqueous solution may include phosphoric acid as well as $(NH_4)_5DTPA$, and may include a molar ratio of phosphoric acid to $(NH_4)_5DTPA$ of about 1:3, about 1:2, about 1:1, about 2:1, about 3:1, or any range including and/or in between any two of these values.

In any embodiment disclosed herein, during the contacting there may be a weight ratio of the composition to $Na_4EDTA$ (i.e., the $Na_4EDTA$ in the aqueous solution prior to contacting) of about 50:1 to about 500:1; thus, the weight ratio of the composition to $Na_4EDTA$ in the aqueous solution may be about 50:1, about 55:1, about 60:1, about 65:1, about 70:1, about 75:1, about 80:1, about 85:1, about 90:1, about 95:1, about 100:1, about 120:1, about 140:1, about 160:1, about 180:1, about 200:1, about 220:1, about 240:1, about 260;1, about 280:1, about 300:1, about 320:1, about 340:1, about 360:1, about 380:1, about 400:1, about 420:1, about 440:1, about 460:1, about 480:1, about 500:1, or any range including and/or in between any two of these values. In any embodiment disclosed herein, the aqueous solution may include a molar ratio of citric acid to $Na_4EDTA$ of about 1:3, about 1:2, about 1:1, about 2:1, about 3:1, or any range including and/or in between any two of these values. In any embodiment disclosed herein, the aqueous solution may include phosphoric acid as well as $Na_4EDTA$, and may include a molar ratio of phosphoric acid to $Na_4EDTA$ of about 1:3, about 1:2, about 1:1, about 2:1, about 3:1, or any range including and/or in between any two of these values.

In any embodiment disclosed herein, during the contacting there may be a weight ratio of the composition to $Na_2H_2EDTA$ (i.e., the $Na_2H_2EDTA$ in the aqueous solution prior to contacting) of about 50:1 to about 500:1; thus, the weight ratio of the composition to $Na_2H_2EDTA$ in the aqueous solution may be about 50:1, about 55:1, about 60:1, about 65:1, about 70:1, about 75:1, about 80:1, about 85:1, about 90:1, about 95:1, about 100:1, about 120:1, about 140:1, about 160:1, about 180:1, about 200:1, about 220:1, about 240:1, about 260;1, about 280:1, about 300:1, about 320:1, about 340:1, about 360:1, about 380:1, about 400:1, about 420:1, about 440:1, about 460:1, about 480:1, about 500:1, or any range including and/or in between any two of these values. In any embodiment disclosed herein, the aqueous solution may include a molar ratio of citric acid to $Na_2H_2EDTA$ of about 1:3, about 1:2, about 1:1, about 2:1, about 3:1, or any range including and/or in between any two of these values. In any embodiment disclosed herein, the aqueous solution may include phosphoric acid as well as $Na_2H_2EDTA$, and may include a molar ratio of phosphoric acid to $Na_2H_2EDTA$ of about 1:3, about 1:2, about 1:1, about 2:1, about 3:1, or any range including and/or in between any two of these values.

In any embodiment disclosed herein, during the contacting there may be a weight ratio of the composition to the monosodium salt of diethylenetriaminepentaacetic acid (i.e., the monosodium salt of diethylenetriaminepentaacetic acid in the aqueous solution prior to contacting) of about 50:1 to about 500:1; thus, the weight ratio of the composition to the monosodium salt of diethylenetriaminepentaacetic acid in the aqueous solution may be about 50:1, about 55:1, about 60:1, about 65:1, about 70:1, about 75:1, about 80:1, about 85:1, about 90:1, about 95:1, about 100:1, about 120:1, about 140:1, about 160:1, about 180:1, about 200:1, about 220:1, about 240:1, about 260;1, about 280:1, about 300:1, about 320:1, about 340:1, about 360:1, about 380:1, about 400:1, about 420:1, about 440:1, about 460:1, about 480:1, about 500:1, or any range including and/or in between any two of these values. In any embodiment disclosed herein, the aqueous solution may include a molar ratio of citric acid to the monosodium salt of diethylenetriaminepentaacetic acid of about 1:3, about 1:2, about 1:1, about 2:1, about 3:1, or any range including and/or in between any two of these values. In any embodiment disclosed herein, the aqueous solution may include phosphoric acid as well as the monosodium salt of diethylenetriaminepentaacetic acid, and may include a molar ratio of phosphoric acid to the monosodium salt of diethylenetriaminepentaacetic acid of about 1:3, about 1:2, about 1:1, about 2:1, about 3:1, or any range including and/or in between any two of these values.

In any embodiment disclosed herein, during the contacting there may be a weight ratio of the composition to the disodium salt of diethylenetriaminepentaacetic acid (i.e., the disodium salt of diethylenetriaminepentaacetic acid in the aqueous solution prior to contacting) of about 50:1 to about 500:1; thus, the weight ratio of the composition to the disodium salt of diethylenetriaminepentaacetic acid in the aqueous solution may be about 50:1, about 55:1, about 60:1, about 65:1, about 70:1, about 75:1, about 80:1, about 85:1, about 90:1, about 95:1, about 100:1, about 120:1, about 140:1, about 160:1, about 180:1, about 200:1, about 220:1, about 240:1, about 260;1, about 280:1, about 300:1, about 320:1, about 340:1, about 360:1, about 380:1, about 400:1, about 420:1, about 440:1, about 460:1, about 480:1, about 500:1, or any range including and/or in between any two of these values. In any embodiment disclosed herein, the aqueous solution may include a molar ratio of citric acid to the disodium salt of diethylenetriaminepentaacetic acid of about 1:3, about 1:2, about 1:1, about 2:1, about 3:1, or any range including and/or in between any two of these values. In any embodiment disclosed herein, the aqueous solution may include phosphoric acid as well as the disodium salt of diethylenetriaminepentaacetic acid, and may include a molar ratio of phosphoric acid to the disodium salt of diethylenetriaminepentaacetic acid of about 1:3, about 1:2, about 1:1, about 2:1, about 3:1, or any range including and/or in between any two of these values.

In any embodiment disclosed herein, during the contacting there may be a weight ratio of the composition to the trisodium salt of diethylenetriaminepentaacetic acid (i.e., the trisodium salt of diethylenetriaminepentaacetic acid in the aqueous solution prior to contacting) of about 50:1 to about 500:1; thus, the weight ratio of the composition to the trisodium salt of diethylenetriaminepentaacetic acid in the aqueous solution may be about 50:1, about 55:1, about 60:1, about 65:1, about 70:1, about 75:1, about 80:1, about 85:1, about 90:1, about 95:1, about 100:1, about 120:1, about 140:1, about 160:1, about 180:1, about 200:1, about 220:1, about 240:1, about 260;1, about 280:1, about 300:1, about 320:1, about 340:1, about 360:1, about 380:1, about 400:1, about 420:1, about 440:1, about 460:1, about 480:1, about 500:1, or any range including and/or in between any two of these values. In any embodiment disclosed herein, the aqueous solution may include a molar ratio of citric acid to the trisodium salt of diethylenetriaminepentaacetic acid of about 1:3, about 1:2, about 1:1, about 2:1, about 3:1, or any range including and/or in between any two of these values. In any embodiment disclosed herein, the aqueous solution may include phosphoric acid as well as the trisodium salt of diethylenetriaminepentaacetic acid, and may include a molar ratio of phosphoric acid to the trisodium salt of diethylenetriaminepentaacetic acid of about 1:3, about 1:2, about 1:1, about 2:1, about 3:1, or any range including and/or in between any two of these values.

In any embodiment disclosed herein, during the contacting there may be a weight ratio of the composition to the tetrasodium salt of diethylenetriaminepentaacetic acid (i.e., the tetrasodium salt of diethylenetriaminepentaacetic acid in the aqueous solution prior to contacting) of about 50:1 to about 500:1; thus, the weight ratio of the composition to the tetrasodium salt of diethylenetriaminepentaacetic acid in the aqueous solution may be about 50:1, about 55:1, about 60:1, about 65:1, about 70:1, about 75:1, about 80:1, about 85:1, about 90:1, about 95:1, about 100:1, about 120:1, about 140:1, about 160:1, about 180:1, about 200:1, about 220:1, about 240:1, about 260;1, about 280:1, about 300:1, about 320:1, about 340:1, about 360:1, about 380:1, about 400:1, about 420:1, about 440:1, about 460:1, about 480:1, about 500:1, or any range including and/or in between any two of these values. In any embodiment disclosed herein, the aqueous solution may include a molar ratio of citric acid to the tetrasodium salt of diethylenetriaminepentaacetic acid of about 1:3, about 1:2, about 1:1, about 2:1, about 3:1, or any range including and/or in between any two of these values. In any embodiment disclosed herein, the aqueous solution may include phosphoric acid as well as the tetrasodium salt of diethylenetriaminepentaacetic acid, and may include a molar ratio of phosphoric acid to the tetrasodium salt of diethylenetriaminepentaacetic acid of about 1:3, about 1:2, about 1:1, about 2:1, about 3:1, or any range including and/or in between any two of these values.

In any embodiment disclosed herein, during the contacting there may be a weight ratio of the composition to $Na_5DTPA$ (i.e., the $Na_5DTPA$ in the aqueous solution prior to contacting) of about 50:1 to about 500:1; thus, the weight ratio of the composition to $Na_5DTPA$ in the aqueous solution may be about 50:1, about 55:1, about 60:1, about 65:1, about 70:1, about 75:1, about 80:1, about 85:1, about 90:1, about 95:1, about 100:1, about 120:1, about 140:1, about 160:1, about 180:1, about 200:1, about 220:1, about 240:1, about 260;1, about 280:1, about 300:1, about 320:1, about 340:1, about 360:1, about 380:1, about 400:1, about 420:1, about 440:1, about 460:1, about 480:1, about 500:1, or any range including and/or in between any two of these values. In any embodiment disclosed herein, the aqueous solution may include a molar ratio of citric acid to $Na_5DTPA$ of about 1:3, about 1:2, about 1:1, about 2:1, about 3:1, or any range including and/or in between any two of these values. In any embodiment disclosed herein, the aqueous solution may include phosphoric acid as well as $Na_5DTPA$, and may include a molar ratio of phosphoric acid to $Na_5DTPA$ of about 1:3, about 1:2, about 1:1, about 2:1, about 3:1, or any range including and/or in between any two of these values.

In any embodiment disclosed herein, it may be that, prior to centrifuging and subsequent to the contacting, a caustic solution is added to the mixture. For example, in any embodiment herein, the caustic solution may include an aqueous hydroxide solution, aqueous bicarbonate solution, aqueous bisulfide solution, aqueous alkoxide solution (e.g., an aqueous methoxide solution), a basic resin dissolved and/or suspended in an aqueous solution, a methoxide solution, or combinations of two or more thereof. In any embodiment herein, the caustic solution may include sodium hydroxide, potassium hydroxide, ammonium hydroxide, sodium bicarbonate, potassium bicarbonate, ammonium bisulfide, sodium methoxide, potassium methoxide, or a combination of any two or more thereof. For example, in any embodiment herein, the caustic solution may be an about 10 wt. % to about 60 wt. % caustic solution (e.g., an about 10% to about 60% by weight aqueous hydroxide solution). In any embodiment herein, it may be that, prior to centrifuging, water is added to the mixture (e.g., where a caustic solution is added to the mixture, water may be added before addition of the caustic solution or after addition of the caustic solution).

In any embodiment disclosed herein, centrifuging the mixture may include producing an aqueous waste in addition to yielding the first treated composition. The aqueous waste may have a pH below about 7.0. The aqueous waste may have a pH of about 6.5, about 6.0, about 5.5, about 5.0, about 4.5, about 4.0, about 3.5, about 3.0, about 2.5, about 2.0, or any range including and/or in between any two of these values or any range below any one of these values. For example, in any embodiment herein, the aqueous waste may have a pH from about 3.5 to about 6.0 or from about 4.0 to about 5.0. The aqueous waste may optionally be treated; the aqueous waste may be treated to reach specific permitting requirements for disposal including, but are not limited to, metals content, biological oxygen demand (BOD), and/or chemical oxygen demand (COD). Such treatment of aqueous waste may include, but is not limited to, microbial degradation (see, e.g., U.S. Pat. No. 9,120,686), carbon adsorption (see, e.g., U.S. Pat. No. 6,315,906), and/or treatment with strong oxidizers such as ozone (see, e.g., U.S. Pat. No. 6,126,842) and/or chlorine dioxide (see, e.g., U.S. Pat. No. 8,663,473).

In any embodiment disclosed herein, the method may include combining the first treated composition with an adsorption media to generate a slurry, where the slurry includes a resultant adsorption media and a second treated composition, and separating the second treated composition from the slurry. Adsorption media (also referred to herein as "sorbent media") may include, but are not limited to, silica (e.g., silica hydrogels, silica hydrogel particles), diatomaceous earth, activated carbon, bleaching clays (also referred to as bleaching earths), perlite, cellulosic media, bauxite, silica aluminates, natural fibers, natural flakes, synthetic fibers, or a combination of any two or more thereof. However, in any embodiment disclosed herein, the method of the present technology may or may not include use of a bleaching clay. The second treated composition of any embodiment disclosed herein may have an amount of total metals that is about 20% or less than the amount of total metals in the composition (e.g., where the composition has 20 wppm total metals, the second treated composition has 4 wppm or less total metals). The second treated composition of any embodiment disclosed herein may have an amount of phosphorus that is about 20% or less than the amount of phosphorus in the composition.

In any embodiment disclosed herein, the adsorption media may include both silica and diatomaceous earth. In any embodiment disclosed herein, the silica may be silica particles, where the silica particles may have an average particle size via laser diffraction analysis from about 10 microns (μm) to about 50 microns. Thus, in any embodiment disclosed herein including silica particles as the adsorption media, the average particle size via laser diffraction analysis of the silica particles may be, but is not limited to, about 10 microns, about 11 microns, about 12 microns, about 13 microns, about 14 microns, about 15 microns, about 16 microns, about 17 microns, about 18 microns, about 19 microns, about 20 microns, about 21 microns, about 22 microns, about 23 microns, about 24 microns, about 25 microns, about 26 microns, about 27 microns, about 28 microns, about 29 microns, about 30 microns, about 35 microns, about 40 microns, about 45 microns, about 50 microns, and any range including and/or in between any two of these values and below any one of these values. In any embodiment disclosed herein including silica particles as the adsorption media, the silica particles may include amorphous silica particles, where the amorphous silica particles may be synthetic amorphous silica, natural amorphous silica, or a combination thereof. In any embodiment disclosed herein where the adsorption media includes both silica and diatomaceous earth ("DE"), the weight ratio of DE to silica (DE:silica) in the slurry is about 0.1:1 to about 1.5:1; thus, the weight ratio DE:silica for any embodiment herein may be about 0.1:1, about 0.2:1, about 0.3:1, about 0.4:1, about 0.5:1, about 0.6:1, about 0.7:1, about 0.8:1, about 0.9:1, about 1:1, about 1.1:1, about 1.2:1, about 1.3:1, about 1.4:1, about 1.5:1, or any range including and/or in between any two of these ratios. Accordingly, in any embodiment disclosed herein where the adsorption media includes both silica particles and diatomaceous earth, the weight ratio of diatomaceous earth to silica particles (DE:silica particles) in the slurry may be about 0.1:1, about 0.2:1, about 0.3:1, about 0.4:1, about 0.5:1, about 0.6:1, about 0.7:1, about 0.8:1, about 0.9:1, about 1:1, about 1.1:1, about 1.2:1, about 1.3:1, about 1.4:1, about 1.5:1, or any range including and/or in between any two of these ratios.

In any embodiment disclosed herein including silica particles as the adsorption media, the silica particles may have a BET surface area from about 200 $m^2/g$ to about 1000 $m^2/g$. The BET surface area may be determined by several methods, including the method described in ASTM-D3663-03 (2008), incorporated herein by reference in its entirety for any and all purposes. The BET surface area of the silica particles may include, but is not limited to about 200 $m^2/g$, about 210 $m^2/g$, about 220 $m^2/g$, about 230 $m^2/g$, about 240 $m^2/g$, about 250 $m^2/g$, about 260 $m^2/g$, about 270 $m^2/g$, about 280 $m^2/g$, about 290 $m^2/g$, about 300 $m^2/g$, about 320 $m^2/g$, about 340 $m^2/g$, about 360 $m^2/g$, about 380 $m^2/g$, about 400 $m^2/g$, about 450 $m^2/g$, about 500 $m^2/g$, about 550 $m^2/g$, about 600 $m^2/g$, about 650 $m^2/g$, about 700 $m^2/g$, about 750 $m^2/g$, about 800 $m^2/g$, about 850 $m^2/g$, about 900 $m^2/g$, about 950 $m^2/g$, about 1000 $m^2/g$, or any range including and/or in between any two of these values.

In any embodiment disclosed herein including silica particles as the adsorption media, the silica particles may have an aqueous solution pH of about 2.0 to about 6.0 when present in an aqueous dispersion at 15 wt. %. Suitable aqueous solution pH values for the silica particles may include, but are not limited to about 2.0, about 2.5, about 3.0, about 3.5, about 4.0, about 4.5, about 5.0, about 5.5, about 6.0, or any range including and/or in between any two of these values. For example, in any embodiment herein, the silica particles may have an aqueous pH from about 2.0 to about 3.5, about 2.0 to about 3.0, about 2.5 to about 3.0, and any range including and/or in between any two of these values and below any one of these values. The silica particles may also have a compacted bulk density of about 100 g/L to about 1000 g/L according to standard bulk density measurement techniques such as ASTM D6393-08 Test E. The compact density of the silica particles may include, but is not limited to about 100 g/L, about 200 g/L, about 300 g/L, about 400 g/L, about 500 g/L, about 600 g/L, about 700 g/L, about 800 g/L, about 900 g/L, about 1000 g/L, and any range including and/or in between any two of these values and below any one of these values. For example, in any embodiment herein, the silica particles may have a compacted bulk density of about 500 g/L.

In any embodiment disclosed herein including silica particles as the adsorption media, the silica particles may be combined with the first treated composition at about 0.1% (weight silica particles to weight of first treated composition) to about 0.8%. The weight silica particles to weight of first treated composition may be about 0.1% (w/w), about 0.15% (w/w), about 0.2% (w/w), about 0.25% (w/w), about 0.30% (w/w), about 0.35% (w/w), about 0.4% (w/w), about 0.45% (w/w), about 0.5% (w/w), about 0.55% (w/w), about 0.6% (w/w), about 0.65% (w/w), about 0.7% (w/w), about 0.75% (w/w), about 0.8% (w/w), or any range including and/or in between any two of these values. For example, in any embodiment herein, the weight silica particles to weight of first treated composition may be from about 0.1% (w/w) to about 0.8% (w/w), about 0.2% (w/w) to about 0.6% (w/w), and about 0.3% (w/w) to about 0.4% (w/w).

In any embodiment disclosed herein, the adsorption media may be combined with the first treated composition at a temperature from about 150° F. to about 200° F. The combining with adsorption media may be conducted at temperatures including but not limited to about 150° F., about 155° F., about 160° F., about 165° F., about 170° F., about 175° F., about 180° F., about 185° F., about 190° F., about 195° F., about 200° F., or any range including and/or in between any two of these values. For example, in any embodiment herein, the temperature may be in the range of about 160° F. to about 190° F.; in any embodiment herein, the temperature may be in the range of about 175° F. to about 185° F.

The slurry, in any embodiment described herein, may be subjected to an absolute pressure of about 100 Torr to about 500 Torr to drive off moisture. The absolute pressure may include, but is not limited to about 100 Torr, about 150 Torr, about 200 Torr, about 250 Torr, about 300 Torr, about 350 Torr, about 400 Torr, about 450 Torr, about 500 Torr, or any range including and/or in between any two of these values.

In any embodiment disclosed herein, combining the first treated composition with the adsorption media to generate a slurry may include a residence time from about 10 min to about 90 min. Suitable residence times may include, but are not limited to about 10 min, about 11 min, about 12 min, about 13 min, about 14 min, about 15 min, about 16 min, about 17 min, about 18 min, about 19 min, about 20 min, about 25 min, about 30 min, about 35 min, about 40 min, about 45 min, about 50 min, about 55 min, about 60 min, about 65 min, about 70 min, about 75 min, about 80 min, about 85 min, about 90 min, or any range including and/or in between any two of these values. For example, in any embodiment herein, the residence time may be from about 20 min to about 50 min. The combining the first treated composition with the adsorption media as described in any embodiment herein may be conducted in a continuous flow operation tank.

Once the slurry is obtained, in any embodiment disclosed herein separating the second treatment composition from the slurry may include removing the resultant adsorption media from the slurry to provide the second treatment composition. In any embodiment disclosed herein, removing the adsorption media from the slurry may include filtering the slurry with one or more filters. For example, in any embodiment herein, the one or more filters may include pressure filtration (such as a vertical- and/or horizontal-leaf filter), filter presses, cartridge filters, compression filters, membrane plate press, disc filters, drum filters, or a combination of any two or more thereof. The one or more filters may include filters pre-coated with DE, cellulose, perlite, or a combination of any two or more thereof. For example, in any embodiment herein, the one or more filters may include pressure leaf filters pre-coated with DE.

As disclosed above regarding the method of the present technology, the composition includes animal fats, animal oils, plant fats, plant oils, vegetable fats, vegetable oils, greases, used cooking oil, or a combination of any two or more thereof. Plant and/or vegetable oils may include, but are not limited to, babassu oil, carinata oil, soybean oil, inedible corn oil, canola oil, coconut oil, rapeseed oil, tall oil, tall oil fatty acid, palm oil, palm oil fatty acid distillate, palm sludge oil, jatropha oil, palm kernel oil, sunflower oil, castor oil, camelina oil, archaeal oil, and mixtures of any two or more thereof. These may be classified as crude, degummed, and RBD (refined, bleached, and deodorized) grade, depending on level of pretreatment and residual phosphorus and metals content. However, any of these grades may be used in the present technology. Animal fats and/or oils as used above may include, but is not limited to, inedible tallow, edible tallow, technical tallow, floatation tallow, lard, poultry fat (e.g., chicken fat), poultry oils, fish fat, fish oils, and mixtures thereof. Greases may include, but are not limited to, yellow grease, brown grease, used cooking oil, waste vegetable oils, restaurant greases, trap grease from municipalities such as water treatment facilities, and spent oils from industrial packaged food operations and mixtures of any two or more thereof. For example, in any embodiment herein, the composition may include yellow grease, brown grease, floatation grease, poultry fat, inedible corn oil, used cooking oil, inedible tallow, floatation tallow, palm sludge oil, or a mixture of any two or more thereof.

The composition includes about 8 wppm or more of total metals as measured by Inductively Coupled Plasma (ICP) spectroscopic methods such as ICP-AES (atomic emission spectroscopy) and ICP-OES (optical emission spectroscopy), such as AOCS Recommended Practice Ca 17-01. Such metals may include, but are not limited to, As, Ca, Cr, Cu, Fe, K, Li, Mg, Mn, Na, Pb, Sr, Zn, or a combination of any two or more thereof. For example, in any embodiment herein, the total metals may include Ca, Fe, K, Mg, and Na. The amount of total metals present in the composition of any embodiment disclosed herein may include from about 10 wppm to about 1000 wppm total metals. Thus, the amount of total metals in the composition of any embodiment disclosed herein may be about 10 wppm, about 15 wppm, about 20 wppm, about 25 wppm, about 30 wppm, about 35 wppm, about 40 wppm, about 45 wppm, about 50 wppm, about 55 wppm, about 60 wppm, about 65 wppm, about 70 wppm, about 75 wppm, about 80 wppm, about 85 wppm, about 90 wppm, about 95 wppm, about 100 wppm, about 105 wppm, about 110 wppm, about 115 wppm, about 120 wppm, about 125 wppm, about 130 wppm, about 135 wppm, about 140 wppm, about 145 wppm, about 150 wppm, about 155 wppm, about 160 wppm, about 165 wppm, about 170 wppm, about 175 wppm, about 180 wppm, about 185 wppm, about 190 wppm, about 195 wppm, about 200 wppm, about 225 wppm, about 250 wppm, about 275 wppm, about 300 wppm, about 325 wppm, about 350 wppm, about 375 wppm, about 400 wppm, about 425 wppm, about 450 wppm, about 475 wppm, about 500 wppm, about 550 wppm, about 600 wppm, about 650 wppm, about 700 wppm, about 750 wppm, about 800 wppm, about 850 wppm, about 900 wppm, about 1000 wppm, or any range including and/or in between any two of these values. For example, suitable amounts of total metals in the composition may be from about 10 wppm to about 1000 wppm, from 10 wppm to 1000 wppm, from about 10 wppm to about 800 wppm, from 10 wppm to 800 wppm, from about 10 wppm to about 600 ppm, from 10 wppm to 600 ppm, from about 10 ppm to about 400 wppm, from 10 ppm to 400 wppm, from about 10 wppm to about 200 wppm, from 10 wppm to 200 wppm, from about 10 wppm to about 100 wppm, from 10 wppm to 100 wppm, from about 10 wppm to about 50 wppm, or from 10 wppm to 50 wppm.

The composition includes about 8 wppm or more of phosphorus measured as elemental phosphorus. The amount of phosphorus in the composition of any embodiment disclosed herein may be about 8 wppm, about 10 wppm, about 15 wppm, about 20 wppm, about 25 wppm, about 30 wppm, about 35 wppm, about 40 wppm, about 45 wppm, about 50 wppm, about 55 wppm, about 60 wppm, about 65 wppm, about 70 wppm, about 75 wppm, about 80 wppm, about 85 wppm, about 90 wppm, about 95 wppm, about 100 wppm, about 110 wppm, about 120 wppm, about 130 wppm, about 150 wppm, about 170 wppm, about 190 wppm, about 200 wppm, about 300 wppm, about 400 wppm, about 500 wppm, about 600 wppm, about 700 wppm, about 800 wppm, or any range including and/or in between any two of these values or any range above any one of these values.

In any embodiment disclosed herein, the composition may include about 10 wppm or more of chlorine measured as elemental chlorine (a Cl atom). The amount of chlorine may be about 10 wppm, about 11 wppm, about 12 wppm, about 13 wppm, about 14 wppm, about 15 wppm, about 16 wppm, about 17 wppm, about 18 wppm, about 19 wppm, about 20 wppm, about 25 wppm, about 30 wppm, about 35 wppm, about 40 wppm, about 45 wppm, about 50 wppm, about 55 wppm, about 60 wppm, about 65 wppm, about 70 wppm, about 75 wppm, about 80 wppm, about 85 wppm, about 90 wppm, about 95 wppm, about 100 wppm, or any range including and/or in between any two of these values or any range above any one of these values.

In any embodiment disclosed herein, the composition may include about 10 wppm or more of sulfur measured as elemental sulfur, such as by AOAC Method 923.01. The amount of sulfur may include, but is not limited to at least about 10 wppm, about 15 wppm, about 20 wppm, about 25 wppm, about 30 wppm, about 35 wppm, about 40 wppm, about 45 wppm, about 50 wppm, about 55 wppm, about 60 wppm, about 65 wppm, about 70 wppm, about 75 wppm, about 80 wppm, about 85 wppm, about 90 wppm, about 95 wppm, about 100 wppm, about 110 wppm, about 120 wppm, about 130 wppm, about 150 wppm, about 170 wppm, about 190 wppm, about 200 wppm, or any range including and/or in between two of these values or any range above any one of these values.

The composition includes about 10 wppm or more of nitrogen measured as elemental nitrogen such as by ASTM D4629-17. The amount of nitrogen in a composition of any embodiment herein may be, but is not limited to, about 10 wppm, about 15 wppm, about 20 wppm, about 25 wppm, about 30 wppm, about 35 wppm, about 40 wppm, about 45 wppm, about 50 wppm, about 55 wppm, about 60 wppm, about 65 wppm, about 70 wppm, about 75 wppm, about 80 wppm, about 85 wppm, about 90 wppm, about 95 wppm, about 100 wppm, about 110 wppm, about 120 wppm, about 130 wppm, about 150 wppm, about 170 wppm, about 190 wppm, about 200 wppm, about 250 wppm, about 300 wppm, about 350 wppm, about 400 wppm, about 450 wppm, about 500 wppm, about 550 wppm, about 600 wppm, about 650 wppm, about 700 wppm, about 750 wppm, about 800 wppm, about 850 wppm, about 900 wppm, about 950 wppm, about 1000 wppm, about 1100 wppm, or any range including and/or in between any two of these values or any range above any one of these values.

The composition includes about 5 wt. % or more of free fatty acids ("FFAs") based on the total weight of the composition as measured by standard analytical techniques such as AOCS Ca 5a-40. Thus, in any embodiment disclosed herein, the amount of FFAs in the composition may be about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 30 wt. %, about 35 wt. %, about 40 wt. %, about 45 wt. %, about 50 wt. %, about 55 wt. %, about 60 wt. %, about 70 wt. %, about 75 wt. %, or any range including and/or in between any two of these values. For example, in any embodiment disclosed herein, the amount of FFAs in the composition may be from about 5 wt. % to about 15 wt. %. In any embodiment disclosed herein, the amount of FFAs in the composition may be from about 5 wt. % to about 10 wt. %.

The composition in any embodiment disclosed herein may have an acid number of about 10 mg KOH/g to about 150 mg KOH/g. Suitable acid number amounts may include, but are not limited to from about 10 mg KOH/g to about 150 mg KOH/g, about 10 mg KOH/g to about 100 mg KOH/g, about 10 mg KOH/g to about 50 mg KOH/g, about 10 mg KOH/g to about 25 mg KOH/g, about 10 mg KOH/g to about 20 mg KOH/g, about 10 mg KOH/g to about 15 mg KOH/g, and any range including and/or in between any two of these values and above any one of these values. For example, in any embodiment herein, the acid number of the composition may be from about 10 mg KOH/g to about 30 mg KOH/g. In another embodiments, the acid number of the composition may be from about 10 mg KOH/g to about 20 mg KOH/g.

The composition may further include polymers. Such polymers may be dissolved polymers, solubilized polymers, particulate polymers, or a mixture of any two or more thereof. Particulate polymers may have a weight average diameter from about 0.01 μm to about 1 millimeter (mm); thus, the particulate polymers may have a weight average diameter of about 0.01 μm, about 0.1 μm, about 1 μm, about 5 μm, about 10 μm, about 25 μm, about 50 μm, about 75 μm, about 80 μm, about 100 μm, about 200 μm, about 300 μm, about 500 μm, about 750 μm, about 1 mm, or any range including and/or in between any two of these values. The particular polymers may have a weight average diameter less than about 0.01 μm. The polymers may be synthetic or natural. A partial list of synthetic polymers is provided in Table 1.

TABLE 1

Examples of Polymers

| Abbrev. | Name |
| --- | --- |
| ABS | Acrylonitrile butadiene styrene rubber |
| ACM | Polyacrylate Rubber |
| AEM | Ethylene-acrylate Rubber |
| AU | Polyester Urethane |
| BIIR | Bromo Isobutylene Isoprene |
| BR | Polybutadiene |
| CIIR | Chloro Isobutylene Isoprene |
| CR | Polychloroprene |
| CSM | Chlorosulphonated Polyethylene |
| ECO | Epichlorohydrin |
| EP | Ethylene Propylene |
| EPDM | Ethylene Propylene Diene Monomer |
| EU | Polyether Urethane |

TABLE 1-continued

Examples of Polymers

| Abbrev. | Name |
|---|---|
| FEPM | Tetrafluoroethylene/propylene rubbers |
| FFKM | Perfluorocarbon elastomers |
| FKM | Fluoroelastomer |
| FMQ | Fluoro Silicone |
| FPM | Fluorocarbon Rubber |
| HDPE | High density Polyethylene |
| HNBR | Hydrogenated Nitrile Butadiene |
| IR | Polyisoprene |
| HR | Isobutylene Isoprene rubber |
| LDPE | Low density polyethylene |
| NBR | Acrylonitrile Butadiene |
| PE | Polyethylene |
| PIB | Polyisobutene |
| PP | Polypropylene |
| PS | Polystyrene |
| PVC | Poly vinyl choloride |
| PVDC | Polyvinylidene chloride |
| PU | Polyurethane |
| SBR | Styrene Butadiene |
| SEBS | Styrene Ethylene Butylene Styrene Copolymer |
| SI | Polysiloxane |
| VMQ | Vinyl Methyl Silicone |
| XNBR | Acrylonitrile Butadiene Carboxy Monomer |
| XSBR | Styrene Butadiene Carboxy Monomer |
| YBPO | Thermoplastic Polyether-ester |
| YSBR | Styrene Butadiene Block Copolymer |
| YXSBR | Styrene Butadiene Carboxy Block Copolymer |
| — | Latex products |
| — | Synthetic rubbers |
| — | Natural rubbers |
| — | Neoprene |
| — | Chloroprene derivatives |
| — | Fluorinated Polymers |
| — | Polyesters |
| — | Polyamides |
| — | Polyacetals |

In any embodiment disclosed herein, the synthetic polymers may include acrylonitrile butadiene styrene thermoplastic, polyacrylate rubber, ethylene-acrylate rubber, polyester urethane, bromo isobutylene isoprene rubber, polybutadiene rubber, chloro isobutylene isoprene rubber, polychloroprene, chlorosulphonated polyethylene, epichlorohydrin, ethylene propylene rubber, ethylene propylene diene monomer, polyether urethane, tetrafluoroethylene/propylene rubbers, perfluorocarbon elastomers, fluoroelastomer, fluoro silicone, fluorocarbon rubber, high density polyethylene, hydrogenated nitrile butadiene, polyisoprene, isobutylene isoprene rubber, low density polyethylene, polyethylene terephthalate, ethylene vinyl acetate, acrylonitrile butadiene, polyethylene, polyisobutene, polypropylene, polystyrene, polyvinyl chloride, polyvinylidene chloride, polyurethane, styrene butadiene, styrene ethylene butylene styrene copolymer, polysiloxane, vinyl methyl silicone, acrylonitrile butadiene carboxy monomer, styrene butadiene carboxy monomer, thermoplastic polyether-ester, styrene butadiene block copolymer, styrene butadiene carboxy block copolymer, polyesters, polyamides, polyacetals, polylactic acid, or mixtures of any two or more thereof. For example, in any embodiment herein, the polymers may include, but are not limited to, polyethylene, chlorosulphonated polyethylene, low density polyethylene, high density polyethylene, polyethylene terephthalate, polylactic acid, or a combination of any two or more thereof. Natural polymers may include proteins, oligopeptides, polysaccharides, and lignins.

In any embodiment disclosed herein, the amount of polymers in the composition may be about 0.05 wppm, about 0.1 wppm, about 0.5 wppm, about 0.1 wppm, about 5 wppm, about 10 wppm, about 15 wppm, about 20 wppm, about 25 wppm, about 30 wppm, about 35 wppm, about 40 wppm, about 45 wppm, about 50 wppm, about 55 wppm, about 60 wppm, about 65 wppm, about 70 wppm, about 75 wppm, about 80 wppm, about 85 wppm, about 90 wppm, about 95 wppm, about 100 wppm, about 105 wppm, about 110 wppm, about 115 wppm, about 120 wppm, about 125 wppm, about 130 wppm, about 135 wppm, about 140 wppm, about 145 wppm, about 150 wppm, about 155 wppm, about 160 wppm, about 165 wppm, about 170 wppm, about 175 wppm, about 180 wppm, about 185 wppm, about 190 wppm, about 195 wppm, about 200 wppm, about 225 wppm, about 250 wppm, about 275 wppm, about 300 wppm, about 325 wppm, about 350 wppm, about 375 wppm, about 400 wppm, about 425 wppm, about 450 wppm, about 475 wppm, about 500 wppm, about 550 wppm, about 600 wppm, about 650 wppm, about 700 wppm, about 750 wppm, about 800 wppm, about 850 wppm, about 900 wppm, about 1000 wppm, about 1500 wppm, about 2000 wppm, about 2500 wppm, about 3000 wppm, about 3500 wppm, about 4000 wppm, about 4500 wppm, about 5000 wppm, about 5000 wppm, about 5500 wppm, about 6000 wppm, about 6500 wppm, about 7000 wppm, about 7500 wppm, about 8000 wppm, about 8500 wppm, about 9000 wppm, about 9500 wppm, about 10,000 wppm, about 10,500 wppm, about 11,000 wppm, and any range including and/or in between any two of these values and above any one of these values. In any embodiment herein, it may be that the composition may include no detectable polymers. By "detectable" as used throughout herein is meant detection on commercially available detection instruments known in the art.

The composition in any embodiment disclosed herein may include about 15 mg or more sediment per 100 mL of composition. This determination of sediment is measured according to the method described in AOCS Ca 3d-02 with the exception that the method should be conducted at 65° C. as opposed to 20° C.

In any embodiment disclosed herein, the composition may have an alkalinity value of about 200 mg/kg and about 6,000 mg/kg as measured by AOCS Test Method Cc 17-95. Thus, in any embodiment disclosed herein, the composition may have an alkalinity value as measured by AOCS Test Method Cc 17-95 of about 200 mg/kg, about 300 mg/kg, about 400 mg/kg, about 500 mg/kg, about 600 mg/kg, about 700 mg/kg, about 800 mg/kg, about 900 mg/kg, about 1,000 mg/kg, about 1,200 mg/kg, about 1,400 mg/kg, about 1,600 mg/kg, about 1,800 mg/kg, about 2,000 mg/kg, about 2,500 mg/kg, about 3,000 mg/kg, about 3,500 mg/kg, about 4,000 mg/kg, about 4,500 mg/kg, about 5,000 mg/kg, about 5,500 mg/kg, about 6,000 mg/kg, or any range including and/or in between any two of these values.

The composition may or may not undergo pretreatment prior to contacting the composition with the aqueous solution. Such pretreatments may include, but are not limited to, FFA stripping, bleaching, deodorizing, water washing, glycerolysis, degumming, alkalinity reduction, or a combination of any two or more thereof. Glycerolysis typically involves reducing the amount of FFAs by reaction of the composition with glycerol, such as described in U.S. Pat. No. 7,087,771, incorporated herein by reference. Products of this reaction may include mono-glycerides, di-glycerides, tri-glycerides, or a mixture of two or more thereof. For example, a representative reaction for converting a FFA to mono-glyceride may be illustrated as follows:

$$R-COOH + CH_2(OH)CH(OH)CH_2OH \leftrightarrow R-COOCH_2CH(OH)CH_2OH + H_2O$$

As such, glycerolysis may reduce an FFA content to about 15 wt. % or less, such as a range of about 5 wt. % to about 15 wt. % (about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, or any range including and/or in between any two of these values). For example, in any embodiment of the present technology the FFA content of the composition may be reduced to about 10 wt. % or less prior to contacting the composition with the aqueous solution by pretreating the composition (e.g., via glycerolysis); as another example, in any embodiment of the present technology, the FFA content may be reduced to a value within the range of about 5 wt. % to about 10 wt. % prior to contacting the composition with the aqueous solution by glycerolysis pretreating of the composition.

One type of degumming is acid degumming, which includes contacting the composition with concentrated aqueous acids prior to contacting the composition with the aqueous solution. Exemplary acid degumming processes are described in U.S. Pat. No. 9,404,064, incorporated herein by reference. Exemplary acids may include phosphoric acid, citric acid, and maleic acid. Acid degumming may reduce metals such as calcium and magnesium as well as reduce phosphorus. Similarly, alkalinity reduction is typically performed by adding an acid (referring to any acid, such as citric acid) to a composition having high alkalinity. The acid has the effect of neutralizing soaps and/or chelating metal ions. Process equipment used for acid degumming and/or alkalinity reduction may include high shear mixers, recirculating mixers, decanter centrifuges, and/or disk stack centrifuges.

Thus, alkalinity reduction may reduce the concentration of metals in the composition, in particular Fe, Ca, K, and Na, prior to contacting the composition with aqueous solution. In any embodiment herein, alkalinity reduction may include contacting the composition with steam to heat the composition to provide a steam-heated composition, combining the steam-heated composition with an acid (e.g., citric acid) to provide an acid-contacted composition, combining the acid-contacted composition with water and subsequently agitating to provide a mixture that includes homogeneously-dispersed droplets, and then separating a sludge phase, an aqueous phase, and an oil phase in a three-phase centrifuge, wherein the oil phase is a "pretreated composition" having a reduced total metals content and reduced alkalinity (in comparison to the composition) where the "pretreated composition" is used in the method (e.g., in any embodiment herein, the method may include contacting the "pretreated composition" with the aqueous solution to yield the mixture). The steam-heated composition may be at a temperature of about 150° F. to about 200° F. The amount of acid (e.g., citric acid) combined with the steam-heated composition may be about 0.2 wt. % to about 10.0 wt. % (based on the composition mass). The amount of water combined with the acid-contacted composition may be about 0.2 wt. % to about 10.0 wt. % (based on the composition mass). Agitation may include use of an agitator, a recirculation loop, any other means of mixing, or a combination of any two or more thereof. The total time of the agitation (e.g., total mixing time) may be about 2 to about 90 minutes. The pretreated composition may include a reduced amount of metals based on the amount of total metals in the composition prior to alkalinity reduction. Alkalinity reduction may provide a total metals content that is about 40% to about 99% lower than the composition prior to such alkalinity reduction.

In any embodiment disclosed herein, the method of the present technology may or may not include bleaching with bleaching clays. Bleaching typically involves contacting a degummed composition with adsorbent clay and filtering the spent clay through a pressure leaf filter. Bleaching clays (e.g., Fuller's Earth, TONSIL®) are known to be effective in removing color bodies that contain nitrogen compounds (e.g., chlorophyll) and other polar species. However, at the relatively high FFA concentrations typical of raw FOG compositions of the present technology, metals such as Fe, Mg, and Ca leach off of the clay and further contaminate the composition.

As discussed earlier, in any embodiment disclosed herein, the first treated composition and/or the second treated composition may have an amount of total metals that is about 20% or less than the amount of total metals in the composition (e.g., where the composition has 20 wppm total metals, the second treated composition has 4 wppm or less total metals). Thus, in any embodiment disclosed herein, the first treated composition and/or the second treated composition may have an amount of total metals that is about 20% that of the composition, about 15% that of the composition, about 10% that of the composition, about 5% that of the composition, about 1% that of the composition, about 0.1% that of the composition, about 0.01% that of the composition, or any range including and/or in between any two or these values, or any range less than any one of these values. In any embodiment disclosed herein, the first treated composition and/or the second treated composition may have an amount of phosphorus that is about 20% that of the composition, about 15% that of the composition, about 10% that of the composition, about 5% that of the composition, about 1% that of the composition, about 0.1% that of the composition, about 0.01% that of the composition, or any range including and/or in between any two or these values, or any range less than any one of these values.

The first treated composition and/or the second treated composition of any embodiment disclosed herein may include reduced amounts of phosphorus, total metals, sulfur, nitrogen, and/or chlorine while including an amount of free fatty acids that is about the same as the amount of free fatty acids in the composition. The first treated composition and/or the second treated composition of any embodiment disclosed herein may include about 5 wt. % to about 10 wt. % free fatty acids. The amount of free fatty acids in first treated composition and/or the second treated composition of any embodiment disclosed herein may be, but is not limited to, about 5 wt. %, about 6 wt. %, about 7 wt. %, about 8 wt. %, about 9 wt. %, about 10 wt. %, or any range including and/or in between any two of these values.

The first treated composition and/or the second treated composition of any embodiment disclosed herein may have an acid number from about 10 mg KOH/g to about 150 mg KOH/g. Suitable acid number amounts may include, but are not limited to from about 10 mg KOH/g to about 150 mg KOH/g, about 10 mg KOH/g to about 100 mg KOH/g, about 10 mg KOH/g to about 50 mg KOH/g, about 10 mg KOH/g to about 25 mg KOH/g, about 10 mg KOH/g to about 20 mg KOH/g, about 10 mg KOH/g to about 15 mg KOH/g, or any range including and/or in between any two of these values. For example, in any embodiment herein, the acid number of the first treated composition and/or the second treated composition may be from about 10 mg KOH/g to about 30 mg KOH/g, and may be about 10 mg KOH/g, about 11 mg KOH/g, about 12 mg KOH/g, about 13 mg KOH/g, about 14 mg KOH/g, about 15 mg KOH/g, about 16 mg KOH/g, about 17 mg KOH/g, about 18 mg KOH/g, about 19 mg KOH/g, about 20 mg KOH/g, about 21 mg KOH/g, about 22 mg KOH/g, about 23 mg KOH/g, about 24 mg KOH/g, about 25 mg KOH/g, about 26 mg KOH/g, about 27 mg KOH/g, about 28 mg KOH/g, about 29 mg KOH/g, about 30 mg KOH/g or any range including and/or in between any two of these values.

The first treated composition and/or the second treated composition of any embodiment disclosed herein may include less than about 10 wppm of total metals. The amount of total metals in the first treated composition and/or the second treated composition of any embodiment disclosed herein may be about 9 wppm, about 8 wppm, about 7 wppm, about 6 wppm, about 5 wppm, about 4 wppm, about 3 wppm, about 2 wppm, about 1 wppm, about 0.9 wppm, about 0.8 wppm, about 0.7 wppm, about 0.6 wppm, about 0.5 wppm, about 0.4 wppm, about 0.3 wppm, about 0.2 wppm, about 0.1 wppm, or any range including and/or in between any two of these values or any range less than any one of these values. For example, in any embodiment herein, the amount of total metals in the first treated composition and/or the second treated composition may be less than about 5 wppm.

The first treated composition and/or the second treated composition of any embodiment disclosed herein may include less than about 8 wppm phosphorous; thus, the amount of phosphorus in first treated composition and/or the second treated composition of any embodiment disclosed herein may be about 7 wppm, about 6 wppm, about 5 wppm, about 4 wppm, about 3 wppm, about 2 wppm, about 1 wppm, about 0.9 wppm, about 0.8 wppm, about 0.7 wppm, about 0.6 wppm, about 0.5 wppm, about 0.4 wppm, about 0.3 wppm, about 0.2 wppm, about 0.1 wppm, or any range including and/or in between any two of these values or any range less than any one of these values.

The first treated composition and/or the second treated composition of any embodiment disclosed herein may include less than about 10 wppm chlorine; the amount of chlorine in first treated composition and/or the second treated composition of any embodiment disclosed herein may be about 9 wppm, about 8 wppm, about 7 wppm, about 6 wppm, about 5 wppm, about 4 wppm, about 3 wppm, about 2 wppm, about 1 wppm, about 0.9 wppm, about 0.8 wppm, about 0.7 wppm, about 0.6 wppm, about 0.5 wppm, about 0.4 wppm, about 0.3 wppm, about 0.2 wppm, about 0.1 wppm, or any range including and/or in between any two of these values or any range less than any one of these values.

The first treated composition and/or the second treated composition of any embodiment disclosed herein may include less than about 5 wppm of sulfur. The amount of sulfur in first treated composition and/or the second treated composition of any embodiment disclosed herein may be about 4 wppm, about 3 wppm, about 2 wppm, about 1 wppm, about 0.9 wppm, about 0.8 wppm, about 0.7 wppm, about 0.6 wppm, about 0.5 wppm, about 0.4 wppm, about 0.3 wppm, about 0.2 wppm, about 0.1 wppm, or any range including and/or in between any two of these values or any range less than any one of these values.

The first treated composition and/or the second treated composition of any embodiment disclosed herein may include less than about 250 wppm nitrogen. The amount of nitrogen in first treated composition and/or the second treated composition of any embodiment disclosed herein may be about 240 wppm, about 230 wppm, about 220 wppm, about 210 wppm, about 200 wppm, about 190 wppm, about 180 wppm, about 170 wppm, about 160 wppm, about 150 wppm, about 140 wppm, about 130 wppm, about 120 wppm, about 110 wppm, about 100 wppm, about 95 wppm, about 90 wppm, about 85 wppm, about 80 wppm, about 75 wppm, about 70 wppm, about 65 wppm, about 60 wppm, about 50 wppm, about 45 wppm, about 40 wppm, about 35 wppm, about 30 wppm, about 25 wppm, about 20 wppm, about 15 wppm, about 10 wppm, about 5 wppm, about 1 wppm, or any range including and/or in between any two of these values or any range less than any one of these values.

The first treated composition and/or the second treated composition of any embodiment disclosed herein may include less than about 15 mg sediment per 100 mL of treated composition. Thus, the amount of sediment per 100 mL of first treated composition and/or the second treated composition of any embodiment disclosed herein may be about 15 mg, about 14 mg, about 13 mg, about 12 mg, about 11 mg, about 10 mg, about 9 mg, about 8 mg, about 7 mg, about 6 mg, about 5 mg, about 4 mg, about 3 mg, about 2 mg, about 1 mg, about 0.1 mg, about 0.01 mg, or any range including and/or in between any two of these values, or less than any one of these values.

The first treated composition and/or the second treated composition of any embodiment disclosed herein may include about 1 wppm or less of sodium soaps.

The method of the present technology may further include subjecting the first treated composition and/or the second treated composition of any embodiment disclosed herein to hydroprocessing. Hydroprocessing as used herein describes various types of catalytic reactions that occur in the presence of hydrogen without limitation. Examples of the most common hydroprocessing reactions may include, but are not limited to, hydrogenation, hydrodesulfurization (HDS), hydrodenitrogenation (HDN), hydrotreating (HT), hydrocracking (HC), aromatic saturation or hydrodearomatization (HDA), hydrodeoxygenation (HDO), decarboxylation (DCO), hydroisomerization (HI), hydrodewaxing (HDW), hydrodemetallization (HDM), decarbonylation, methanation, and reforming. Depending upon the type of catalyst, reactor configuration, reactor conditions, and feedstock composition, multiple reactions can take place that range from purely thermal (i.e., do not require a catalyst) to catalytic.

To further aid in one's understanding the present technology, a non-limiting example of a method of the present technology is discussed below with reference to FIG. 1. In the method diagramed in FIG. 1, a FOG feed 101 including mono-, di-, and triglycerides, and at least 5 wt % FFA is brought into contact in mixer 10 with an aqueous solution 102 that includes $(NH_4)_2H_2EDTA$, $(NH_4)_4EDTA$, a combination of citric acid and $Na_4EDTA$, a combination of citric acid and $Na_2H_2EDTA$, or a combination of any two or more thereof.

The FOG feed 101 has an alkalinity in the range of 200 to 20,000 mg/kg, a total metals of about 10 wppm and a phosphorus content of about 10 wppm or greater. In any embodiment disclosed herein, the FOG feed 101 may have a molar ratio of phosphorus to polyvalent metal ions (e.g., Fe, Ca, Mg, and Cu) between 0.1:1 and 2:1, between 0.3:1 and 1.7:1, between 0.5:1 and 1.2:1, between 0.6:1 and 1.0:1, or between 0.7:1 and 0.9:1.

For FOG feeds with alkalinity values above 1000 mg/kg, an aqueous solution with a pH value less than 7 is preferred. The aqueous solution of any embodiment disclosed herein may have a pH value between 4 and 6. The aqueous solution may be modified depending on the alkalinity of the FOG—with a lower pH for lower alkalinity and higher pH for higher alkalinity—while staying in a pH range of about 4 to 9 for a 200-6000 mg/kg FOG alkalinity range.

Referring back to FIG. 1, a volume ratio of FOG feed 101 to aqueous solution 102 may be between 10:1 to 100:1 depending on the dilution level of the chelating agent and the concentration of phosphorus and metals in FOG feed 101. In preferred embodiments, the volume ratio of FOG feed 101 to aqueous solution 102 is between 20:1 and 80:1.

The temperature of the FOG feed 101 at the point of contacting the aqueous solution 102 may be between 140° F. and 300° F., preferably between 180° F. and 260° F. The mixer 10 of FIG. 1 is a continuous high shear mixer. Such mixers are known to persons skilled in the art and are characterized by a rotor (rotating component) and a stator (stationary component) wherein the rotor is connected to a motor by a shaft, and the stator is configured with holes or slots. The aqueous solution 102 is thus sheared into fine droplets within the FOG producing a two phase mixture 103 comprising a dispersed phase and a continuous phase. The droplet size in the two phase mixture 103 may be in the 1-1000 micron range, with at least 80% in the 10-100 micron size range. It will be appreciated by a person of ordinary skill in the art that the cited objective of mixer 10 may be met by other apparatus, including a static mixer, an orifice plate/valve, an eductor, or an agitated tank.

The two-phase mixture 103 is directed to a residence tank 20 to provide mixture 104. The purpose of the residence tank 20 is to provide the residence time needed for the chelation of the metals, conversion of non-hydratable phospholipids (NHPs) to hydratable phospholipids, migration of the hydratable phospholipids to the droplet oil/water interface, and for coalescing of the fine droplets into larger droplets (thereby facilitating subsequent oil/water separation). The residence time in the residence tank 20 is between 5 minutes and 100 minutes, preferably between 10 minutes and 60 minutes. The residence tank 20 may be equipped with a mixing device providing tank circulation while avoiding rigorous agitation. Additional water may be added to residence tank 20.

The mixture 104 is directed to a first centrifuge 30 wherein a first heavy phase 105 comprising water and the chelated metals is separated from a first light phase (i.e., including treated FOG). Heavy phase 105 may optionally be further treated according to water treatment methods known to a person of ordinary skill in art (e.g., as previously described herein) to remove metals or other chemical contaminants in the water.

The first centrifuge 30 is a disc-stack centrifuge. A disc-stack centrifuge is useful for separation tasks that involve low solids concentrations and small particle and droplet sizes encountered in the type of liquid-liquid and liquid-solid compositions that make up the chelated product compositions employed in the disclosed method. A disc-stack centrifuge generally separates solids and one or two liquid phases from each other in a single continuous process, using very high centrifugal forces. The denser phases (e.g., the heavy phase comprising water, chelated metals dissolved therein, and the phospholipids concentrated in the oil/water interface) are subject to such great forces that they are forced outwards against a rotating bowl wall, while less dense liquids (the light phase including treated FOG) form concentric inner layers. The centrifuge may be tuned to permit precise division of oil/water interface to optimize separation. The "disc-stack" portion of the centrifuge includes plates that provide additional surface area on which components of a centrifuging feed material may settle based on density. It is the particular configuration, shape, and design of these plates that permits the centrifuge to continuously separate a wide range of solids from a mixture of liquids. A concentrated solid (e.g., a sludge) may be continuously, intermittently, or manually removed, as desired by the operator. Disc-stack centrifuges suitable for use in accordance with a method of the present technology are commercially available from, for example, Alfa Laval (Sweden) and GEA Westfalia Separator Group (Germany). It will be appreciated by a person of ordinary skill in the art that the cited objective of centrifuge 30 may be met by other apparatus, including a horizontal centrifuge, a three-phase centrifuge, or a solid bowl centrifuge.

Depending on the metal and phosphorus contaminant content of the FOG feed 101, the first light phase 106 may have a total concentration of polyvalent metals iron, calcium, magnesium, and copper less than 3 wppm (e.g., less than 2.5 wppm, less than 2 wppm, less than 1.5 wppm, less than 1.0 wppm, or less than 0.5 wppm) and may have a total concentration of polyvalent metals Fe, Ca, Mg, and Cu from 0.1 wppm to 2.0 wppm or between 0.2 wppm and 1.5 wppm. The first light phase 106 may contain monovalent metals Na and K at less than 3 wppm (e.g., less than 2.5 wppm, less than 2 wppm, or less than 1.5 wppm). The first light phase 106 may have a phosphorus content of less than 4 wppm (e.g., less than 3.5 wppm, less than 3.0 wppm, less than 2.5 wppm, less than 2.0 wppm, or less than 1.5 wppm).

The first light phase 106 may show at least 80% reduction in metals and phosphorus compared to the FOG feed 101 (i.e., the amount of total metals and phosphorous is 20% that of the FOG feed 101). The reduction in Ca, Cu, Fe, Mg, Na, K, Li, and P may be at least 85%, and may be at least 90%. The reduction in phosphorus may be at least 90% (e.g., at least 94%) and the reduction in iron may at least 95% (e.g., at least 96%). Accordingly, the first light phase 106 may be suitable for conversion to renewable diesel, renewable gasoline, or other biofules; e.g., in HDO reactors.

The first light phase 106 may optionally be contacted with a pH adjustment solution 107 in a contactor 40 to provide a pH-adjusted first light phase 108. This option may be exercised to lower the pH with an acid when the aqueous chelating agent pH is above 7 and raise the pH with a base when the aqueous chelating agent pH is below 7. The aqueous solution 102 may have a pH between 4 and 6, and the pH adjustment solution 107 may be a 10 wt. %-30 wt. % caustic solution (e.g., 10 wt. %-30 wt. % sodium hydroxide in water). Where aqueous solution 102 has a pH between 8 and 9, the pH adjustment solution 107 may be a 20%-50% citric acid solution (i.e., 20 wt. %-50 wt. % citric acid in water). The pH adjustment solution 107 may also be a 20%-80% phosphoric acid solution.

The contactor 40 is a device for bringing the first light phase (oil) and the pH adjustment solution (aqueous) in intimate contact. The contactor 40 may be a static mixer or may be a high shear mixer similar to the high shear mixer described earlier herein.

As indicated in FIG. 1, the pH adjusted light phase 108 is processed through a second centrifuge 50 to separate a second heavy phase 109 from a second light phase 110. The centrifuge 50 may functionally be the same as the centrifuge 30 described earlier herein. The pH of the second heavy phase 109 may used to control the relative amount of the pH adjustment solution 107. Further, additional water may introduced to the first and/or the second centrifuge. Preferably, the water used is deionized water, demineralized water, or steam condensate.

The second light phase 110 has the same or less total metal and phosphorus as the first light phase 106. The second light phase 110 may be contacted with additional water, as described above, and may be subjected to an additional separation step (not shown) in the form of a centrifuge or decanting tank to produce a third light phase. The second light phase 110 may have a phosphorus content less than about 3 wppm and total Ca, Cu, Fe, Mg, Na, and K metal content less than about 3 wppm, and may be directed to at least one HDO reactor. Optionally, the first, the second, and/or the third light phase may be treated with sorbent media (not shown) to provide a sorbent-treated feedstock for HDO conversion. The sorbent-treated feedstock has phosphorus and total Ca, Cu, Fe, Mg, Na, and K metal contents that are lower than the second light phase 110.

Various sorbent media are known to persons skilled in the art, as discussed previously in this disclosure. Such media are often in powder form and are contacted with the light phases 106 or 110 in a slurry tank before separation in a pressure leaf filter. It may be that at least one HDO reactor includes a high porosity inert media as a last layer of filtration for the treated FOG described herein (e.g., the first light phase, the second light phase, the third light phase, and/or the sorbent-treated feedstock) before it comes into contact with the HDO catalyst.

The present technology, thus generally described, will be understood more readily by reference to the following examples, which are provided by way of illustration and are not intended to be limiting of the present technology.

EXAMPLES

Comparative Example 1: Citric Acid Alone and Na$_4$EDTA Alone

A mixture of fats, oils, and greases (raw FOG) including commercially-sourced used cooking oil and having a fatty acid content greater than 5 wt. % (potentiometric titration indicated FFA was approximately 9.5 wt. %) was subjected to treatment with two different grades of tetrasodium EDTA, Trilon® B and Trilon® BX (acquired from BASF) according to prior art; e.g., U.S. Pat. No. 6,407,271, U.S. Pat. Publ. No. 2010/0056833. These were labeled "Na$_4$EDTA-1" and "Na$_4$EDTA-2," respectively. The procedure involved mixing about 100 grams of raw FOG with about 0.68 grams of 50 wt. % aqueous Na$_4$EDTA at temperature of about 65° C. in a beaker equipped with a high shear mixer. The high shear mixer was a Silverson model LM5-A operated at a setting of 2000 rpm. After 60 seconds, the shear mixer was stopped and approximately 2.1 grams of deionized water was added to the beaker and sheared again at 2000 rpm for about 2 seconds to incorporate the water. The beaker was then placed on a stir plate and mixed, using a PTFE stir bar, for approximately 20 minutes at 82° C. After 20 minutes elapsed, approximately 0.1 grams of 50% sodium hydroxide solution and 2.1 grams of deionized water were added to the beaker. The contents continued to mix on the stir plate at 82° C. for about another 5 minutes. Finally, the contents of the beaker were dispensed in two equal aliquots into 100 mL glass centrifuge tubes and centrifuged at 1800 rpm for about 10 minutes at approximately 82° C. using the lab centrifuge. The light phase was subsequently pipetted into a beaker and mixed, using the high shear mixer, with about 3.9 grams of water for 10 seconds at 82° C. The contents were centrifuged again at same conditions as first centrifugation to obtain treated FOG samples. The treatment was repeated with citric acid at the same molar addition rate as the EDTA runs. The raw FOG and the treated FOG samples were analyzed for elemental contaminants using a Spectro Arcos inductively coupled plasma optical emission spectrophotometer. The results of these experiments are summarized in Table I.

Table I highlights the deficiencies of prior art in improving treatment of FOG containing relatively high free fatty acid contents by using a more effective chelating agent. Although Na$_4$EDTA resulted in a significant increase in the removal of phosphorus and some polyvalent metals, the improvement was offset by a much larger increase in sodium by reaction with FFA in the FOG to produce sodium soaps as evidenced by the elevated alkalinity shown in Table II. As such, the net effect was an increase in the contaminant content of the treated FOG.

TABLE I

Elemental Contaminant Profile (wppm) for Example 1
Raw FOG Treatments with Different Chelating Agents

| Elemental Contaminant | Raw FOG | Citric Acid | Na$_4$EDTA-1 | Na$_4$EDTA-2 |
|---|---|---|---|---|
| Polyvalent metals | | | | |
| Ca | 7.3 | 0.1 | <0.1 | <0.1 |
| Cu | 0.6 | 0.2 | 0.1 | 0.1 |
| Fe | 14.0 | 0.4 | 0.2 | 0.2 |
| Mg | 1.3 | <0.1 | <0.1 | <0.1 |
| Monovalent metals | | | | |
| Na | 17.9 | 1.9 | >208.3 | >177.5 |
| K | 13.5 | <0.1 | 5.6 | 4.6 |
| Non-metals | | | | |
| P | 22.8 | 4.6 | 1.4 | 1.4 |
| Si | 3.1 | 0.6 | 0.6 | 0.5 |

TABLE II

Alkalinity Profile (wppm sodium oleate) for Example
1 Raw FOG Treatments with Different Chelating Agents

| Contaminant | Citric Acid | Na$_4$EDTA-1 | Na$_4$EDTA-2 |
|---|---|---|---|
| Alkalinity | 40 | 2200 | 2200 |

Comparative Example 2. Adsorption Treatment of Treated FOG from Comparative Example 1

In order to see if the teachings of the prior art regarding soap removal solve the deficiencies of the EDTA prior art, the samples of treated FOG from Comparative Example 1 experiments were subjected to adsorption treatment. See, e.g., U.S. Pat. No. 5,298,639, U.S. Pat. No. 5,231,201. For this set of experiments, approximately 100 grams of each Comparative Example 1 treated FOG product was contacted with about 0.4 grams of Trysil® 300 silica hydrogel (product of Grace Materials Technologies) and 0.4 grams of Celatom FW40 diatomaceous earth (DE) acquired from EP Minerals. This was conducted in a glass Erlenmeyer flask with agitation at 500 rpm at 87° C. After 35 minutes, the slurry was vacuum-filtered through a Whatman 5 filter paper and analyzed via ICP-AES as described before. The results are summarized in Table III.

As observed in Table III, the adsorbent media was not able to remove the high level of sodium introduced by the Na$_4$EDTA in Comparative Example 1. In other words, combining the chelating prior art and the adsorption prior art did not correct the deficiencies introduced by applying the former to FOG feedstocks with relatively high free fatty acid contents.

TABLE III

Elemental Contaminant Profile (wppm) of Comparative Example 2 Treated FOG (corresponding to chelating agents of Comparative Example 1)

| Elemental Contaminant | Citric Acid | $Na_4EDTA$-1 | $Na_4EDTA$-2 |
|---|---|---|---|
| Polyvalent metals | | | |
| Ca | <0.1 | <0.1 | <0.1 |
| Cu | 0.2 | 0.1 | 0.1 |
| Fe | 0.2 | 0.2 | 0.1 |
| Mg | <0.1 | <0.1 | <0.1 |
| Monovalent metals | | | |
| Na | 1.4 | >155.7 | >130.0 |
| K | <0.1 | 1.7 | 1.6 |

TABLE III-continued

Elemental Contaminant Profile (wppm) of Comparative Example 2 Treated FOG (corresponding to chelating agents of Comparative Example 1)

| Elemental Contaminant | Citric Acid | $Na_4EDTA$-1 | $Na_4EDTA$-2 |
|---|---|---|---|
| Non-metals | | | |
| P | 1.8 | 0.9 | 0.8 |
| Si | 0.5 | 0.4 | 0.4 |

Example 3. Example of a Method of the Present Technology

Raw FOG of Example 1 was subjected to two-step treatment by (1) chelating agent and (2) adsorbent media according to Examples 1 and 2, respectively, with the exception that $Na_4EDTA$ was replaced by a chelating agent of present technology: $Na_4EDTA$ in combination with citric acid, $(NH_4)_2H_2EDTA$, and $(NH_4)_4EDTA$. Citric acid as the sole chelating agent was rerun as the control (prior art) chelating agent. The results are summarized in Table IV.

As observed in Table IV, the elevated sodium problem associated with application of sodium salts of EDTA to FOG feedstocks with relatively high free fatty acid contents is solved by the method of the present technology while also retaining the phosphorus reduction advantages of EDTA compared to citric acid control. The reduction in sodium provided by $Na_4EDTA$ in combination with citric acid is much greater than suggested by comparing Comparative Example 1 and Comparative Example 2's results from citric acid alone and $Na_4EDTA$ alone, suggesting a synergistic advantage of the combination of citric acid and $Na_4EDTA$.

Surprisingly, and contrary to the significant elevation of sodium levels by using $Na_4EDTA$ alone, $(NH_4)_2H_2EDTA$, and $(NH_4)_4EDTA$ each did not elevate the nitrogen content from the raw FOG. The nitrogen in all treated FOG samples of Example 3 is within the 46-54 ppm range and well below the raw FOG nitrogen content of 63.1 ppm, suggesting a net removal of nitrogen compounds that (without being bound to theory) may include ammonium soaps that may have formed.

TABLE IV

Elemental Contaminant Profile (wppm) for Example 3 Raw FOG Treatments with Different Chelating Agents

| Elemental Contaminant | Raw FOG | Citric Acid | $Na_4EDTA$/ Citric Acid (1:1 mol ratio) | $(NH_4)_2H_2EDTA$ | $(NH_4)_4EDTA$ |
|---|---|---|---|---|---|
| Polyvalent metals | | | | | |
| Ca | 7.3 | 0.2 | 0.2 | 0.1 | 0.4 |
| Cu | 0.6 | 0.2 | 0.2 | 0.2 | 0.2 |
| Fe | 14.0 | 0.3 | 0.4 | 0.3 | 0.3 |
| Mg | 1.3 | <0.1 | <0.1 | <0.1 | <0.1 |
| Monovalent metals | | | | | |
| Na | 17.9 | 0.9 | 2.9 | 0.6 | 1.7 |
| K | 13.5 | <0.1 | <0.1 | <0.1 | <0.1 |
| Non-metals | | | | | |
| P | 22.8 | 1.5 | 1.0 | 1.0 | 1.0 |
| Si | 3.1 | 0.7 | 0.6 | 0.6 | 0.5 |
| N | 63.1 | 46.4 | 44.6 | 49.4 | 54.0 |

While certain embodiments have been illustrated and described, it should be understood that changes and modifications can be made therein in accordance with ordinary skill in the art without departing from the technology in its broader aspects as defined in the following claims. Each aspect and embodiment described above can also have included or incorporated therewith such variations or aspects as disclosed in regard to any or all of the other aspects and embodiments.

The present technology is also not to be limited in terms of the particular aspects and/or embodiments described herein, which are intended as single illustrations of individual aspects and/or embodiments of the present technology. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

The embodiments, illustratively described herein, may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. A method comprising
  contacting a composition with an aqueous solution to yield a mixture, wherein
    the composition comprises
      one or more of animal fats, animal oils, plant fats, plant oils, vegetable fats, vegetable oils, greases, and used cooking oil,
      about 5 wt. % or more of free fatty acids,
      about 10 wppm or more of total metals,
      about 8 wppm or more phosphorus,
      about 20 wppm or more of nitrogen, and
    the aqueous solution comprises $(NH_4)_2H_2EDTA$, $(NH_4)_4EDTA$, a monoammonium salt of diethylenetriaminepentaacetic acid, a diammonium salt of diethylenetriaminepentaacetic acid, a triammonium salt of diethylenetriaminepentaacetic acid, a tetraammonium salt of diethylenetriaminepentaacetic acid, $(NH_4)_5DTPA$, a combination of citric acid and $Na_4EDTA$, a combination of citric acid and $Na_2H_2EDTA$, a combination of citric acid and a monosodium salt of diethylenetriaminepentaacetic acid, a combination of citric acid and a disodium salt of diethylenetriaminepentaacetic acid, a combination of citric acid and a trisodium salt of diethylenetriaminepentaacetic acid, a combination of citric acid and a tetrasodium salt of diethylenetriaminepentaacetic acid, a combination of citric acid and $Na_5DTPA$, or a combination of any two or more thereof, and
  centrifuging the mixture to yield a first treated composition, wherein the first treated composition has less total metals and less phosphorus than the composition.

B. The method of Paragraph A, wherein, prior to centrifuging, a caustic solution is added to the mixture.

C. The method of Paragraph B, wherein the caustic solution comprises an aqueous ammonium hydroxide solution, aqueous potassium hydroxide solution, aqueous sodium hydroxide solution, or a combination of any two or more thereof.

D. The method of any one of Paragraphs A-C, wherein, prior to centrifuging, water is added to the mixture.

E. The method of any one of Paragraphs A-D, wherein the method further comprises
  combining the first treated composition with an adsorption media to generate a slurry, the slurry comprising a resultant adsorption media and a second treated composition; and
  separating the second treated composition from the slurry;
  wherein the second treated composition has an amount of total metals and an amount of phosphorus that is about 20% or less than the amount of total metals and an amount of phosphorus in the composition.

F. The method of Paragraph E, wherein the adsorption media comprises one or both of silica and diatomaceous earth.

G. The method of Paragraph F, wherein the adsorption media comprises both silica and diatomaceous earth, and the adsorption media has a weight ratio of diatomaceous earth to silica of about 0.1:1 to about 1.5:1.

H. The method of any one of Paragraphs A-G, wherein during the contacting, a weight ratio of the composition to $(NH_4)_2H_2EDTA$ in the aqueous solution is about 50:1 to about 500:1.

I. The method of any one of Paragraphs A-H, wherein during the contacting, a weight ratio of the composition to $(NH_4)_4EDTA$ is about 50:1 to about 500:1.

J. The method of any one of Paragraphs A-I, wherein during the contacting, a weight ratio of the composition to $Na_4EDTA$ in the aqueous solution is about 50:1 to about 500:1.

K. The method of any one of Paragraphs A-J, wherein the combination of citric acid and $Na_4EDTA$ comprises a molar ratio of citric acid to $Na_4EDTA$ of about 1:3 to about 3:1.

L. The method of any one of Paragraphs A-K, wherein the combination of citric acid and $Na_2H_2EDTA$ comprises a molar ratio of citric acid to $Na_2H_2EDTA$ of about 1:3 to about 3:1.

M. The method of any one of Paragraphs A-L, wherein the aqueous solution comprises a combination of citric acid and $(NH_4)_2H_2EDTA$.

N. The method of Paragraph M, wherein the combination of citric acid and $(NH_4)_2H_2EDTA$ comprises a molar ratio of citric acid to $(NH_4)_2H_2EDTA$ of about 1:3 to about 3:1.

O. The method of any one of Paragraphs A-N, wherein the aqueous solution comprises a combination of citric acid and $(NH_4)_4EDTA$.

P. The method of Paragraph O, wherein the combination of citric acid and $(NH_4)_4EDTA$ comprises a molar ratio of citric acid to $(NH_4)_4EDTA$ of about 1:3 to about 3:1.

Q. The method of any one of Paragraphs A-P, wherein during the contacting, a weight ratio of the composition to $(NH_4)_5DTPA$ in the aqueous solution is about 50:1 to about 500:1.

R. The method of any one of Paragraphs A-Q, wherein the aqueous solution comprises a combination of citric acid and $(NH_4)_5DTPA$.

S. The method of Paragraph R, wherein the combination of citric acid and $(NH_4)_5DTPA$ comprises a molar ratio of citric acid to $(NH_4)_5DTPA$ of about 1:3 to about 3:1.

T. The method of any one of Paragraphs A-S, wherein during the contacting, a weight ratio of the composition to $Na_5DTPA$ in the aqueous solution is about 50:1 to about 500:1.

U. The method of any one of Paragraphs A-T, wherein the combination of citric acid and $Na_5DTPA$ comprises a molar ratio of citric acid to $Na_5DTPA$ of about 1:3 to about 3:1.

V. The method of any one of Paragraphs A-U, wherein composition comprises about 5 wt. % to about 15 wt. % free fatty acids W. The method of any one of Paragraphs A-V, wherein the contacting comprises high shear mixing of the composition and the aqueous solution.

X. The method of any one of Paragraphs A-W, wherein centrifuging comprises a disc-stack centrifuge.

Y. The method of any one of Paragraphs A-X, wherein the composition has an alkalinity value of about 200 mg/kg and about 6,000 mg/kg as measured by AOCS Test Method Cc 17-95.

Z. The method of any one of Paragraphs A-Y, wherein aqueous solution has a pH of about 4 to about 6.

AA. The method of any one of Paragraphs A-Z, wherein the first treated composition comprises about 1 wppm or less of sodium soaps.

AB. The method of any one of Paragraphs A-AA, wherein the second treated composition comprises about 1 wppm or less of sodium soaps.

AC. The method of any one of Paragraphs A-AB, wherein the method further comprises hydroprocessing the first treated composition.

AD. The method of any one of Paragraphs E-AC, wherein the method further comprises hydroprocessing the second treated composition.

AE. The method of any one of Paragraphs A-AD, wherein the method does not comprise contacting the composition with bleaching clays.

AF. The method of any one of Paragraphs A-AE, wherein the method comprises centrifuging the mixture to yield the first treated composition and an aqueous waste.

AG. The method of Paragraph AF, wherein the aqueous waste is treated to reduce metals content of the aqueous waste, reduce biological oxygen demand of the aqueous waste, and/or reduce chemical oxygen demand of the aqueous waste.

AH. A method for pretreating feedstock for biofuels production, the method comprising
(a) providing a fat, oil, and grease (FOG) feed comprising mono-, di-, and triglycerides with a free fatty acid content greater than 5 wt %;
(b) providing an aqueous chelating agent comprising ethylenediaminetetraacetic acid (EDTA);
(b) contacting the aqueous chelating agent with the FOG feed to provide a two-phase mixture, and
(c) separating the two phase mixture into a light phase and a heavy phase in a centrifuge, wherein
the FOG feed has a total concentration of polyvalent metals between 10 and 50 wppm, a total of monovalent metals sodium, potassium, and lithium in the same range, and a phosphorus content greater than 10 wppm, and the light phase shows at least 80% reduction in metals and phosphorus compared to the FOG feed.

AI. The method of Paragraph AH, wherein the aqueous chelating agent comprises an ammonium salt of EDTA.

AJ. The method of Paragraph AH or Paragraph AI, wherein the aqueous chelating agent and the FOG feed are contacted in a high shear mixer.

AK. The method of any one of Paragraphs AH-AJ, wherein the centrifuge is a disc-stack centrifuge.

AL. The method of any one of Paragraphs AH-AK, wherein the light phase is further processed in a second centrifuge.

AM. The method of any one of Paragraphs AH-AL, wherein the light phase is treated with a sorbent.

AN. The method of any one of Paragraphs AH-AM, wherein the light phase is directed to a hydrodeoxygenation reactor.

AO. The method of any one of Paragraphs AH-AN, wherein the FOG feed has an alkalinity value between 200 and 6,000 mg/kg.

AP. The method of any one of Paragraphs AH-AO, wherein the aqueous chelating agent has a pH value between 4 and 6.

AQ. The method of any one of Paragraphs AH-AP, wherein the formation of sodium soaps in the light phase is less than 1 wppm as sodium.

Other embodiments are set forth in the following claims.

What is claimed is:
1. A method comprising
contacting a composition with an aqueous solution to yield a mixture, wherein
the composition comprises
one or more of animal fats, animal oils, plant fats, plant oils, vegetable fats, vegetable oils, greases, and used cooking oil, about 5 wt. % or more of free fatty acids,
about 10 wppm or more of total metals,
about 8 wppm or more phosphorus,
about 20 wppm or more of nitrogen, and
the aqueous solution comprises diammonium dihydrogen ethylenediaminetetraacetate ("$(NH_4)_2H_2EDTA$"), tetraammonium ethylenediaminetetraacetate ("$(NH_4)_4EDTA$"), a monoammonium salt of diethylenetriaminepentaacetic acid, a diammonium salt of diethylenetriaminepentaacetic acid, a triammonium salt of diethylenetriaminepentaacetic acid, a tetraammonium salt of diethylenetriaminepentaacetic acid, pentaammonium diethylenetriaminepentaacetate ("$(NH_4)_5DTPA$"), a combination of citric acid and tetrasodium ethylenediaminetetraacetate ("$Na_4EDTA$"), a combination of citric acid and disodium ethylenediaminetetraacetate ("$Na_2H_2EDTA$"), a combination of citric acid and a monosodium salt of diethylenetriaminepentaacetic acid, a combination of citric acid and a disodium salt of diethylenetriaminepentaacetic acid, a combination of citric acid and a trisodium salt of diethylenetriaminepentaacetic acid, a combination of citric acid and a tetrasodium salt of diethylenetriaminepentaacetic acid, a combination of citric acid and pentasodium diethylenetriaminepentaacetate ("$Na_5DTPA$"), or a combination of any two or more thereof; and centrifuging the mixture to yield a first treated composition, wherein the first treated composition has less total metals and less phosphorus than the composition.

2. The method of claim 1, wherein, prior to centrifuging, a caustic solution is added to the mixture.

3. The method of claim 2, wherein the caustic solution comprises an aqueous ammonium hydroxide solution, aqueous potassium hydroxide solution, aqueous sodium hydroxide solution, or a combination of any two or more thereof.

4. The method of claim 1, wherein, prior to centrifuging, water is added to the mixture.

5. The method of claim 1, wherein the method further comprises
combining the first treated composition with an adsorption media to generate a slurry; and
separating a second treated composition from the slurry;
wherein the second treated composition has an amount of total metals and an amount of phosphorus that is about 20% or less than the amount of total metals and an amount of phosphorus in the composition.

6. The method of claim 5, wherein the adsorption media comprises one or both of silica and diatomaceous earth.

7. The method of claim 6, wherein the adsorption media comprises both silica and diatomaceous earth, and the adsorption media has a weight ratio of diatomaceous earth to silica of about 0.1:1 to about 1.5:1.

8. The method of claim 1, wherein during the contacting, a weight ratio of the composition to $(NH_4)_2H_2EDTA$ in the aqueous solution is about 50:1 to about 500:1.

9. The method of claim 1, wherein during the contacting, a weight ratio of the composition to $(NH_4)_4EDTA$ is about 50:1 to about 500:1.

10. The method of claim 1, wherein during the contacting, a weight ratio of the composition to $Na_4EDTA$ in the aqueous solution is about 50:1 to about 500:1.

11. The method of claim 1, wherein the combination of citric acid and $Na_4EDTA$ comprises a molar ratio of citric acid to $Na_4EDTA$ of about 1:3 to about 3:1.

12. The method of claim 1, wherein the combination of citric acid and $Na_2H_2EDTA$ comprises a molar ratio of citric acid to $Na_2H_2EDTA$ of about 1:3 to about 3:1.

13. The method of claim 1, wherein during the contacting, a weight ratio of the composition to $(NH_4)_5DTPA$ in the aqueous solution is about 50:1 to about 500:1.

14. The method of claim 1, wherein during the contacting, a weight ratio of the composition to $Na_5DTPA$ in the aqueous solution is about 50:1 to about 500:1.

15. The method of claim 1, wherein the combination of citric acid and $Na_5DTPA$ comprises a molar ratio of citric acid to $Na_5DTPA$ of about 1:3 to about 3:1.

16. The method of claim 1, wherein composition comprises about 5 wt. % to about 15 wt. % free fatty acids.

17. The method of claim 1, wherein the contacting comprises high shear mixing of the composition and the aqueous solution.

18. The method of claim 1, wherein the first treated composition comprises about 1 wppm or less of sodium soaps.

19. The method of claim 1, wherein the method further comprises hydroprocessing the first treated composition.

20. The method of claim 5, wherein the method further comprises hydroprocessing the second treated composition.

* * * * *